(12) United States Patent
Maeda et al.

(10) Patent No.: US 7,342,599 B2
(45) Date of Patent: Mar. 11, 2008

(54) OPTICAL SCANNER FOR SCANNING A LASER BEAM IN ACCORDANCE WITH AN IMAGE SIGNAL

(75) Inventors: Teruo Maeda, Iwatsuki (JP); Keiichi Mikami, Iwatsuki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 593 days.

(21) Appl. No.: 10/626,712

(22) Filed: Jul. 25, 2003

(65) Prior Publication Data

US 2004/0130609 A1 Jul. 8, 2004

(30) Foreign Application Priority Data

Dec. 12, 2002 (JP) ............... 2002-360458

(51) Int. Cl.
*B41J 15/14* (2006.01)
*B41J 27/00* (2006.01)

(52) U.S. Cl. ...................... 347/242; 347/257

(58) Field of Classification Search ............. 347/128, 347/148, 237–238, 241–245, 247, 256–261, 347/263; 372/36, 107; 355/47; 359/204
See application file for complete search history.

(56) References Cited

U.S. PATENT DOCUMENTS

| | | | |
|---|---|---|---|
| 5,351,264 A * | 9/1994 | Kato et al. ................. | 372/107 |
| 5,490,158 A * | 2/1996 | Mogi ........................... | 372/36 |
| 5,774,248 A * | 6/1998 | Komatsu .................... | 359/204 |
| 6,469,772 B1 * | 10/2002 | Itabashi ...................... | 355/47 |
| 6,992,690 B2 * | 1/2006 | Mogi et al. ................. | 347/238 |

FOREIGN PATENT DOCUMENTS

| | | | | |
|---|---|---|---|---|
| JP | 63014331 A | * | 1/1988 | |
| JP | A 64-6917 | | 1/1989 | |
| JP | 06067102 A | * | 3/1994 | |
| JP | A 6-77604 | | 3/1994 | |
| JP | 2000249957 A | * | 9/2000 | |
| JP | 2003022542 A | * | 1/2003 | |

* cited by examiner

*Primary Examiner*—Hai Pham
(74) *Attorney, Agent, or Firm*—Oliff & Berridge, PLC

(57) ABSTRACT

In a disclosed optical scanner, an optical axis adjustment is made by moving a circuit board on which a light emitting device open-type semiconductor laser is mounted along a base face of an optical box. For a high-quality optical scanning, the circuit board is attached to the base face of the optical box. The invention provides a light emitting element open-type in which a semiconductor laser is disposed in an optical box which is almost hermetically sealed with a cover to avoid adhesion of dusts, electrostatic destroy, and deterioration in picture quality.

19 Claims, 25 Drawing Sheets

FIG. 5
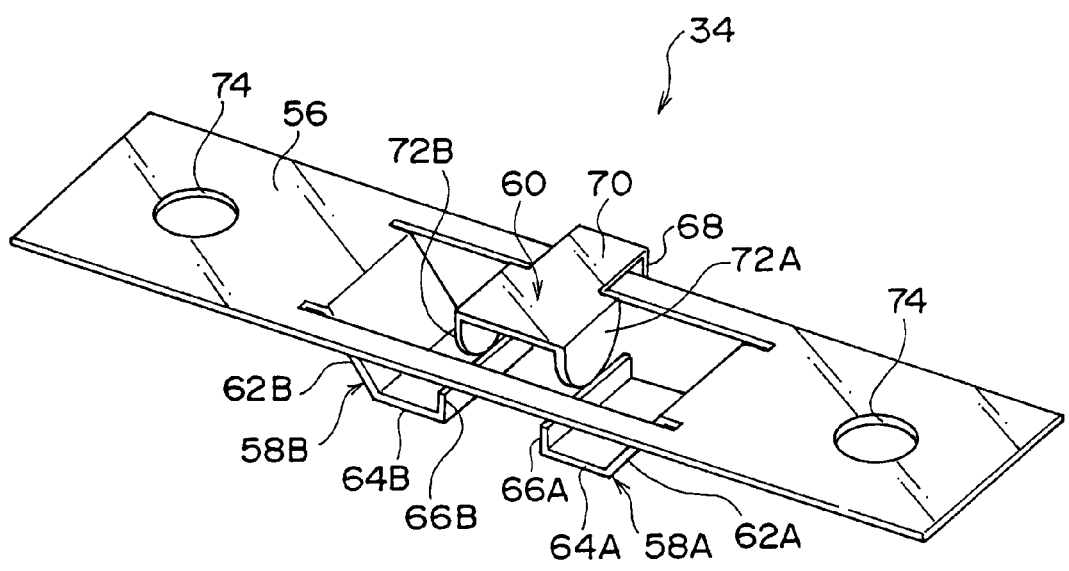
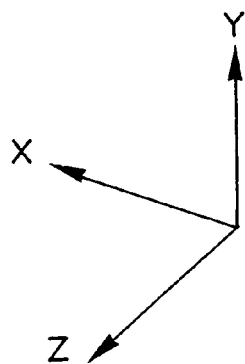

FIG. 6
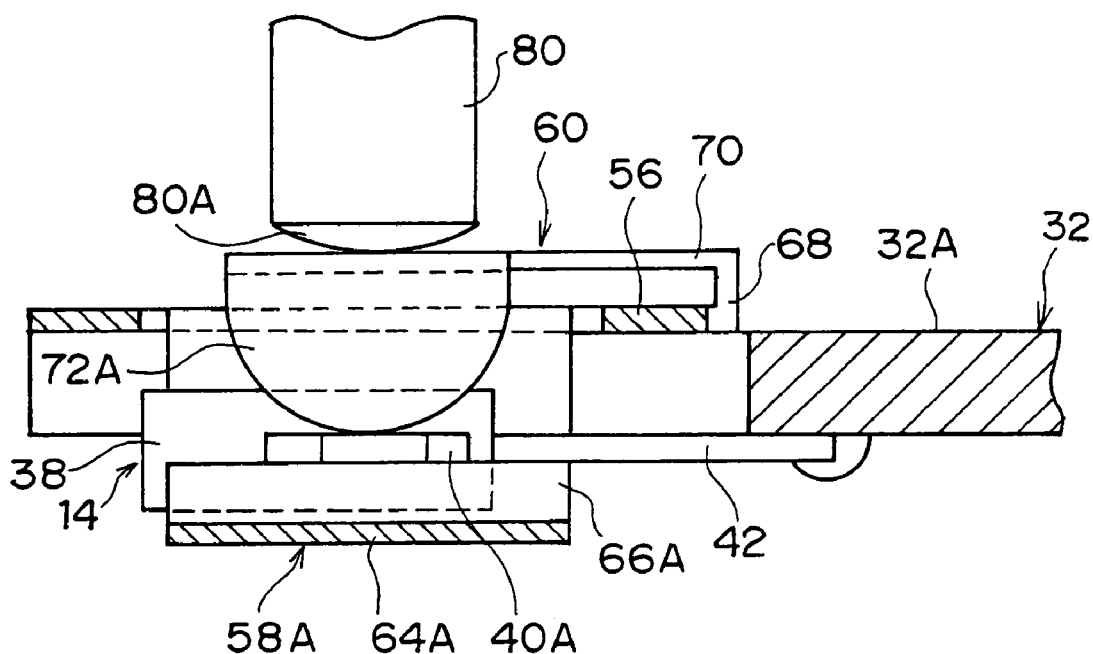
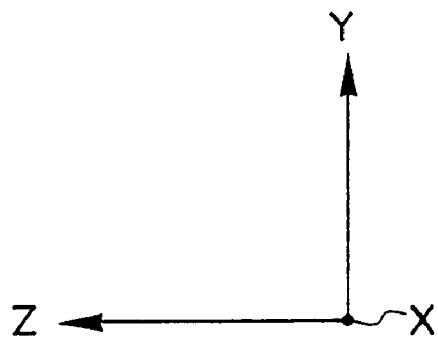

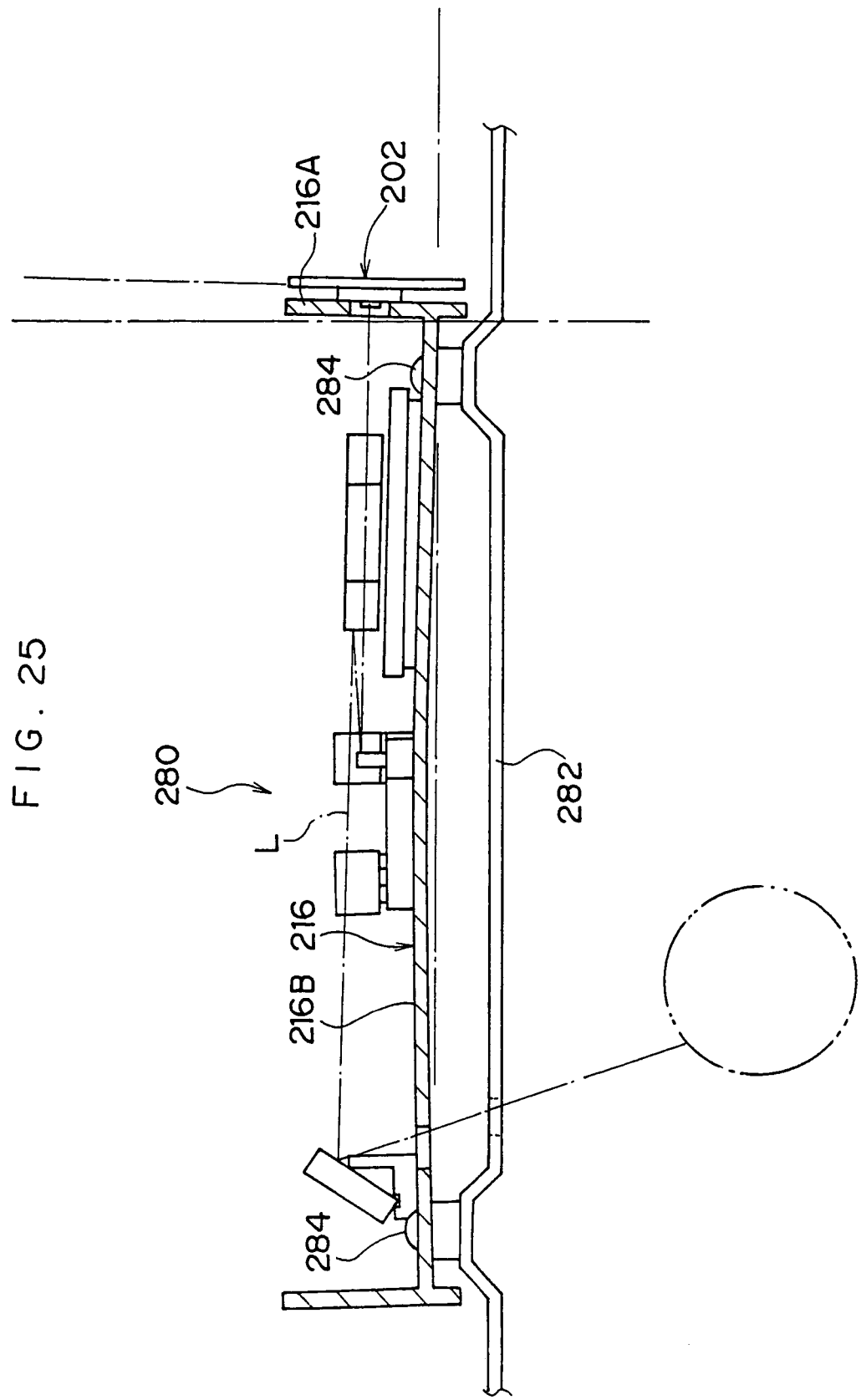

OPTICAL SCANNER FOR SCANNING A LASER BEAM IN ACCORDANCE WITH AN IMAGE SIGNAL

CROSS-REFERENCE TO RELATED APPLICATION

This application claims priority under 35 USC 119 from Japanese Patent Application No. 2002-360458, the disclosure of which is incorporated by reference herein.

BACKGROUND OF THE INVENTION

1. Technical Field

The present invention relates to an optical scanner for scanning a laser beam in accordance with an image signal.

2. Description of the Related Art

Image recorders such as a laser beam printer or a digital copier for scanning a laser beam and recording an image have been widely used.

In such an image recorder, it is necessary to adjust the optical axis of a semiconductor laser as a light source in an optical scanner. As conventional techniques, various configurations of adjusting an optical axis have been proposed. Some optical axis adjusting mechanisms will be described hereinbelow.

In an optical scanner 200 (hereinafter, referred to as conventional technique 1) used for a conventional image recorder, as shown in FIG. 19, a laser beam emitted from a semiconductor laser 204 (refer to FIG. 20) of light source 202 is made parallel by a collimator lens 206. The laser beam is further condensed in a linear state on a reflection face of a rotary polygon mirror 210 by a cylinder-lens 208. The reflection light falls on an unillustrated photosensitive drum through image forming lenses 212 and a reflecting mirror 214. By a main scanning performed by rotation of the rotary polygon mirror 210 and a sub scanning performed by rotation of the photosensitive drum, an electrostatic latent image is formed on the photosensitive drum.

The light source 202 attached to a side wall 216A of an optical box 216 is attached to a circuit board 218. As shown in FIG. 20, the optical axis of a laser beam emitted from the metal cylindrical semiconductor layer 204 is made perpendicular to a board face 218A. To the opposite side of the circuit board 218, a circuit device, a connector 220 for power source, and the like are attached.

As shown in FIG. 19, the light source 202 is attached in such a manner that the semiconductor laser 204 is inserted into an unillustrated opening formed in the side wall 216A of the optical box 216. The circuit board 218 is fixed to a plurality of bearing surfaces for attachment (not shown) provided for the side wall 216A by screws 222.

Accordingly, when making an optical axis adjustment on the light source 202 while allowing a laser beam to be emitted from the semiconductor laser 204, the light source 202 (circuit board 218) is adjusted in the X direction and the Y direction orthogonal to the optical axis direction (Z direction). When the optical axis of the laser beam and the optical axis of the collimator lens 206 coincide with each other, the screws 222 are fastened. Next, the collimator lens 206 is moved in the optical axis direction (Z direction). The laser beam passed through the collimator lens 206 becomes parallel light. When a focus is achieved on the photosensitive member, the collimator lens 206 is fixed.

Next, an optical axis adjustment of another light source (for example, Japanese Patent Application Laid-Open (JP-A) No. 64-6917 which will be referred to as conventional technique 2) will be described with reference to FIG. 21. Components similar to those in the conventional technique 1 are designated by the same reference numerals and their detailed description will not be repeated.

A light source 230 is constructed by two supporting members and is attached to a side wall 232A of a base (optical box) 232. The light source 230 has a first supporting member 236 attached to the base 232 by screws 234, and a second supporting member 240 attached to the first supporting member 236 by screws 238. In the light source 230, by rotating the screws 234 with a driver for unfastening, the first supporting member 236 becomes movable at two degrees of freedom in the vertical direction (Y direction) and the lateral direction (X direction) with respect to the base 232. By fastening the screws 234, the first supporting member 236 is fixed to a predetermined position. To nearly a central position of the second supporting member 240, a semiconductor laser 242 is attached. Guide shafts 246A and 246B provided upright on a face of the first supporting member 236 are inserted in guide holes 244A and 244B. The second supporting member 240 is movable along the guide shafts 246A and 246B. By rotating the screws 238, the second supporting member 240 can be moved in parallel with the optical axis direction (Z direction).

What is requested for higher processing speed and higher resolution of an image recorder are higher scanning speed and improved optical performance of optical scanners. From such a viewpoint, an optical scanner (over-field optical scanner) in which the width of an incident laser beam is set to be larger than the width of the reflection face of a rotary polygon mirror is provided. In the over-field optical scanner, the width of an incident laser beam is larger than the width of the reflection face of the rotary polygon mirror. The position of a light flux reflected as a recording beam in a total luminous flux of the laser beam moves along the direction corresponding to the main scanning direction in association with rotation of the rotary polygonal mirror. Consequently, because a laser beam used in a luminous flux differs according to a scan angle, an intensity distribution of a laser beam exerts a largely influence on a light quantity distribution of a scan line. This necessitates a configuration of the over-field optical scanner capable of adjusting inclination of the optical axis in the main scanning direction. Specifically, as shown in FIGS. 22 and 23, an over-field optical scanner 250 has a following configuration. One end of a second supporting member 240 is elastically pressed by a plate spring 254. The semiconductor laser 242 is provided on a first supporting member 236, being attached to the second supporting member 240 and supported by an axis body 252. An adjusting screw 256 screwed in the first supporting member 236 retains the other end of the supporting member 240.

An adjustment is performed for inclining the optical axis of a laser beam only by θ (refer to FIG. 23) in the main scanning direction by turning (inclining) the second supporting member 240 around the axis body 252 as a center by turning the adjusting screw 256.

In recent years, higher processing speed, higher resolution and lower cost have been demanded for the image recording apparatus. These contradictory conditions need to be satisfied in good balance. As an apparatus satisfying the conditions, there is a low-cost light emitting device open-type semiconductor laser (for example, JP-A No. 6-77604).

Each of the optical axis adjusting methods disclosed in the conventional techniques 1 and 2 is complicated.

Specifically, in the conventional technique 1, to match the optical axis of the metal cylindrical semiconductor laser (hereinbelow, called semiconductor laser) 204 and that of the collimator lens 206, the circuit board 218 supporting the semiconductor laser is adjusted in a plane (XY plane) perpendicular to the optical axis direction. Next, the collimator lens 206 is moved in the optical axis direction to make an adjustment in the optical axis direction (Z direction).

In the conventional technique 2, the optical axes are matched by adjusting the first supporting member 236 in the XY plane. The adjustment in the optical axis direction has to be performed by moving the second supporting member 240 in the Z direction. Moreover, the light source needs two plates of the first supporting member 236 and the second supporting member 240 and a number of guide shafts and screws. The total number of parts increases.

As described above, in the conventional techniques 1 and 2, the adjusting process is complicated. The number of parts constructing the light source for the optical axis adjustment is large. As a result, the manufacturing cost of the light source is high.

As described in the conventional techniques 1 and 2, when attaching the board of the light source to a side wall of the optical box, for example, in the conventional technique 1, height H1 (refer to FIG. 19) of the side wall 216A of the optical box 216 is often set to be higher than height h1 (refer to FIG. 19) of the circuit board 218 of the light source 202. Because the light source 202 is externally attached to the optical box 216, the arrangement is to prevent the optical axis adjustment or the like from being disturbed by a contact with the circuit board 218.

Because the height of the optical box 216 is specified by the circuit board 218, it is difficult to miniaturize the optical scanner 200 (optical box 216).

Further, to facilitate works such as insertion and extraction of connectors, the light source 202 is often not covered with a cover or the like. As a result, dusts are adhered to a light outgoing face of the semiconductor laser 204. This causes deterioration in density due to decrease in the quantity of light or a defect such as a white line because such dusts block laser beams. FIG. 24 is a schematic diagram showing an influence of dusts and equivalents. The case where a dust 270 having a diameter $\phi d$ is adhered to a cover glass face 272 of the external semiconductor laser 204 and the case where the dust 270 is adhered to the built-in collimator lens 206 are compared with each other. When the dust 270 is adhered to the collimator lens 206, because the laser beam is converted to parallel light (a luminous flux having a diameter $\phi X$), the influence on a laser beam of the dust 270 is $\phi d/\phi X$. When the dust 270 is adhered to the cover glass face 272, an influence of a laser spread angle is exerted and the influence ($\phi D1/\phi X$) on the laser beam is large. Because a defect on the photosensitive member increases accordingly, it is necessary to prevent dusts from adhering to the external semiconductor laser 204.

Particularly, when employing the light emitting device open-type semiconductor laser in order to reduce cost, a cover is highly required. However, attachment of the cover cancels the cost reduction.

Further, when the light source 202 is exposed to the outside of the optical box 216, there are cases such that the operator touches the circuit board 218 by mistake during an assembling work or maintenance and the semiconductor laser 204 is electrostatically destroyed. In this case, the light source 202 as an adjusting part cannot be easily replaced, and re-assembly and readjustment are required. Even worse, a serious trouble such as replacing the optical scanner itself occurs.

FIG. 25 is a diagram showing a state where the optical box 216 fixed to a body frame 282 of a conventional optical scanner is thermal-deformed. The optical box 216 of the optical scanner 280 is generally fixed to the body frame 282 of an image recording apparatus with screws 284 in a plurality of positions. In the optical scanner 280, the temperature of the inside of the image forming apparatus rises by heat generated from a motor and an electronic circuit which are in operation, a sliding portion, and the like. If the material of the optical box 216 is different form that of the body frame 282 of the optical scanner 280, the coefficients of thermal expansion will differ between the optical box 216 and the body frame 282. Such difference may cause deflecting of a base face 216B of the optical box 216 and falling of the side wall 216A. Particularly, when the fixing screws 284 are disposed near the base face 216B of the optical box 216 and the coefficient of linear expansion of the optical box 216 is higher than that of the body frame 282, rising temperature will cause deformation of the whole optical box 216 upward like a drum shape, and inclination of the side wall 216A of the optical box 216 to the outer side. This considered that the fixing screws 284 regulate expansion of the optical box 216 on the base face 216B whereas the side wall 216A is relatively free. As a result, the optical axis of a laser beam L emitted from the light source 202 shifts upward. The irradiation position in the photosensitive member may fluctuate, eclipse may occur before a laser beam reaches the photosensitive member, and the picture quality will deteriorate.

In the conventional technique 1, as shown in FIG. 20, the semiconductor laser 204 is attached to the circuit board 218 so that the optical axis of laser outgoing light becomes perpendicular to the board face. An inclination of the optical axis cannot be inherently adjusted. In order to adjust the inclination $\theta$ of the optical axis of the semiconductor laser in the main scanning direction, a part other than the adjusting parts in the X, Y, and Z directions has to be provided.

SUMMARY OF THE INVENTION

An object of the present invention is therefore to provide an optical scanner using a semiconductor laser, in which an optical axis adjustment can be easily made. Another object of the invention is to provide an optical scanner capable of performing a high-quality optical scan.

The invention provides an optical scanner including a semiconductor laser, a circuit board on which the semiconductor laser is mounted, a rotary polygon mirror for deflecting a laser beam emitted from the semiconductor laser, an image forming optical system for forming an image on a photosensitive member by the laser beam deflected by the rotary polygon mirror, and an optical box having an attachment face to which the circuit board is attached. In the optical scanner, an outgoing direction of the laser beam of the semiconductor laser is along the circuit board, and by moving the circuit board along the attachment face, the optical axis of the semiconductor laser is adjusted.

The actions of the invention will be described briefly.

Only by moving the circuit board to which the semiconductor laser is attached along the attachment face of the optical box, a laser beam can be adjusted and an optical axis adjustment is facilitated. Because the semiconductor laser is mounted on the circuit board for guiding the outgoing direction of a laser beam emitted from the semiconductor laser along the circuit board, for example, a focal point adjustment can be made only by moving the circuit board and the adjustment is facilitated.

Because the outgoing direction of a laser beam is along the circuit board, the circuit board (semiconductor laser) can be disposed on the base face (attachment face) of the optical box. Consequently, the height of the side wall of the optical box can be shorter than the case where the circuit board is attached to an external wall of the optical box. The whole optical box can be miniaturized.

Because the optical box is fixed to the body frame of the optical scanner by screwing, deformation of the base face is smaller than the side wall even if the optical box is deformed due to the difference in the coefficient of thermal expansion between the optical box and the body frame. Accordingly, when disposing the circuit board (semiconductor laser) on the base face (attachment face) of the optical box, a deviation of the optical axis due to deformation of the optical box caused by thermal expansion is eliminated. An image of high picture quality can be formed.

Moreover, by disposing the circuit board on the inside (base face) of the optical box which is nearly hermetically sealed, adhesion of ducts on the semiconductor laser is eliminated. Consequently, the picture quality is prevented from deteriorating.

BRIEF DESCRIPTION OF THE DRAWINGS

FIG. 5 is a perspective view showing an elastic member according to the first embodiment of the invention;

FIG. 6 is a side view illustrating a state of holding the semiconductor laser according to the first embodiment of the invention;

FIG. 25 is an explanatory diagram of influences of thermal deformation on the optical axis.

DETAILED DESCRIPTION OF THE INVENTION

An optical scanner and an optical axis adjustment according to a first embodiment of the invention will be described with reference to FIGS. 1 through 16.

First, the optical scanner will be schematically described. A light source and a jig for adjusting an optical axis as main components of the invention will be described.

Brief Description of Optical Scanner

Figure 1:
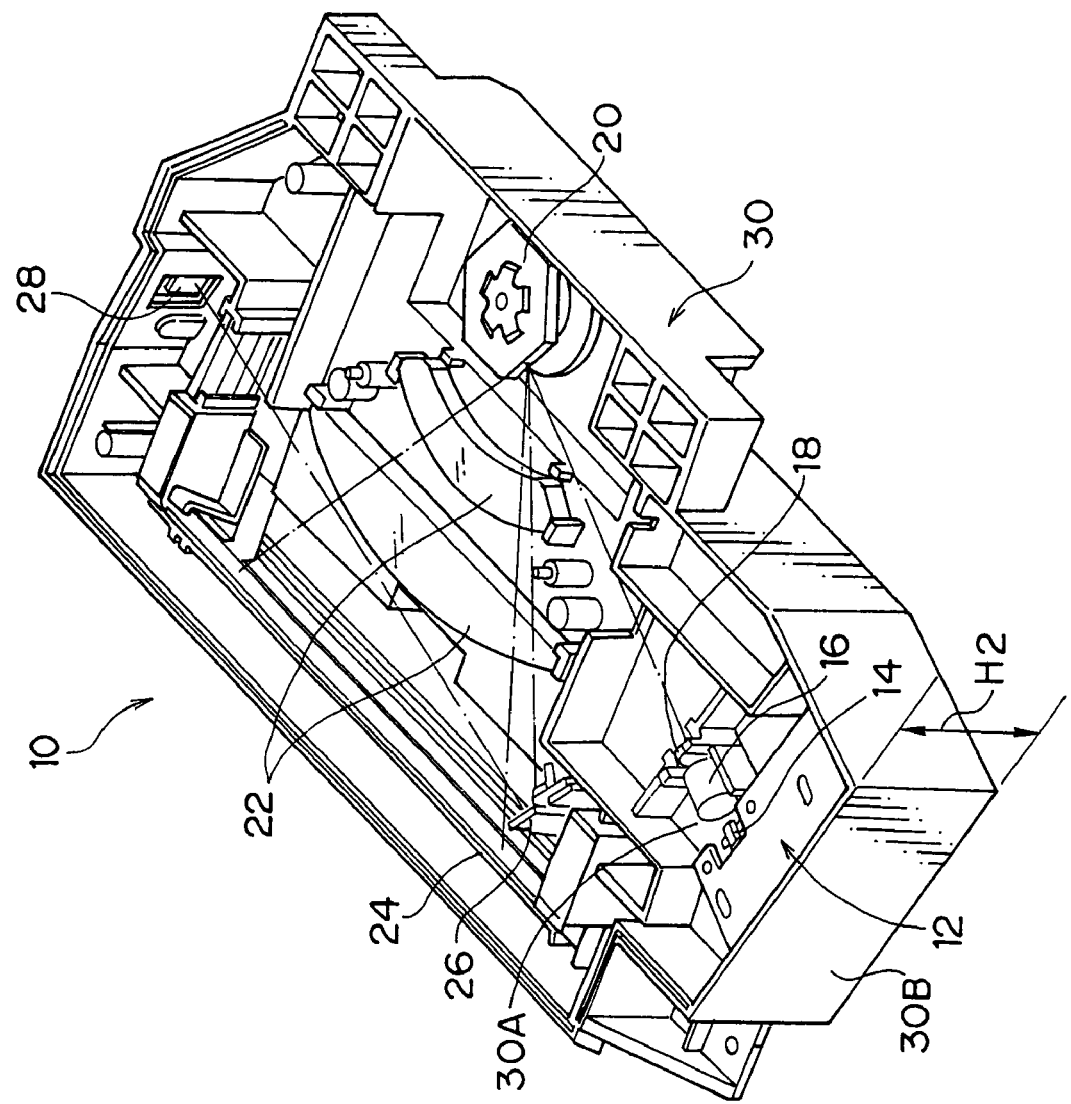
FIG. 1 is a schematic view showing an optical scanner according to a first embodiment of the present invention.

An optical scanner 10 has a configuration as follows. As shown in FIG. 1, a laser beam emitted from a semiconductor laser of light emitting element open type (hereinbelow, called semiconductor laser) 14 of light source 12 is made parallel by a collimator lens 16. The laser beam is further condensed in a linear state onto a reflection face of a rotary polygon mirror 20 by a cylindrical lens 18. The reflection light forms an image on an unillustrated photosensitive drum through an image forming lens 22 and a reflecting mirror 24. The laser beam which forms an image on the photosensitive member forms an electrostatic latent image on the photosensitive drum by a main scanning performed by rotation of the rotary polygon mirror 20 and a sub scanning performed by rotation of the photosensitive drum. A part of the reflection light of the rotary polygon mirror 20 is led to a scan start signal detector 28 by a detection mirror 26 and is transmitted as a scan start signal to the semiconductor laser 14 of the light source 12. The semiconductor laser 14 receives the scan start signal and starts write modulation. An unillustrated cover which is attached to the top almost hermetically seals an optical box 30 in which the parts constructing the optical scanner 10 are disposed.

Light Source

The light source 12 will be described in detail with reference to FIGS. 2 through 9.

The light source 12 is to be mounted on a base face 30A of the optical box 30. The light source 12 is basically constructed with the semiconductor laser 14, a circuit board 32 to which the semiconductor laser 14 is fixed, an elastic member 34 for elastically holding the semiconductor laser 14, and an angle member 36 for making a Y-direction adjustment of an optical axis of outgoing light from the semiconductor laser 14.

Figure 3:
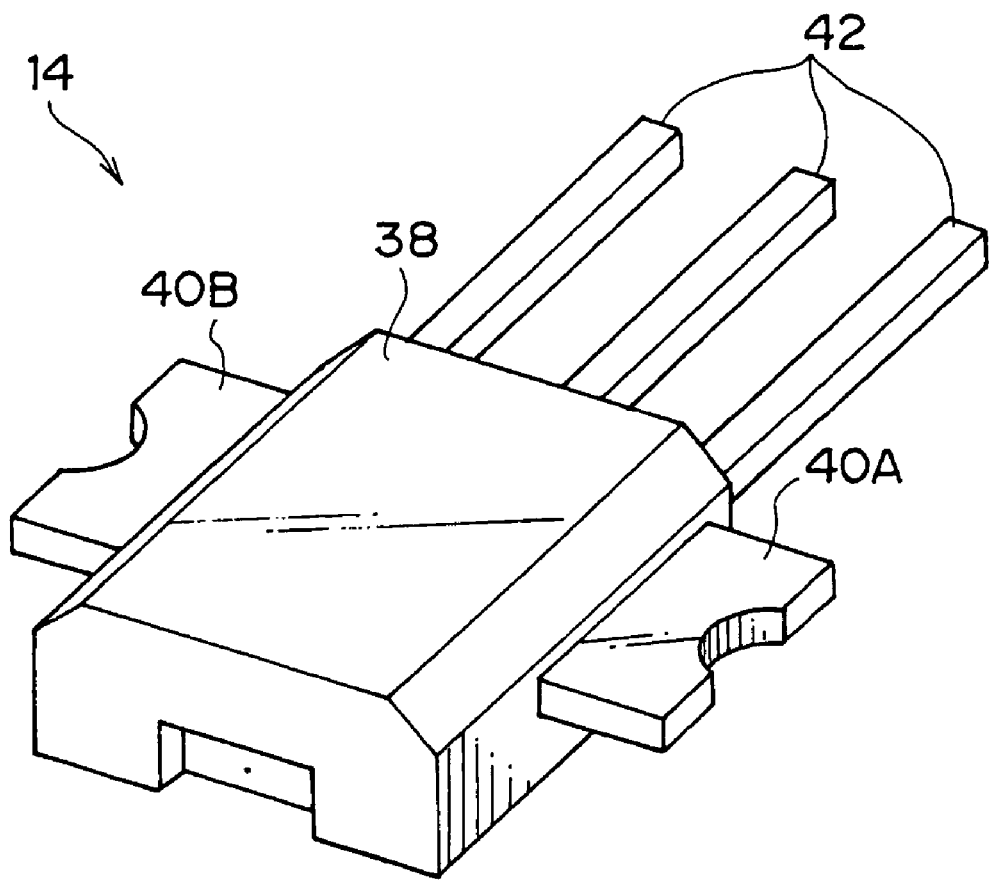
FIG. 3 is a perspective view showing a semiconductor laser according to the first embodiment of the invention.

The semiconductor laser 14 is an open-type semiconductor laser of which light emitting device is exposed to the outside (for example, a frame diode (DL-3150) manufactured by Tottori SANYO Electric Co., Ltd.). In the semiconductor laser 14, as shown in FIG. 3, lead frames 40A and 40B made of a metal to be held by the elastic member 34 are formed on both side faces of an outer insulating frame 38 made of a resin having an almost rectangular shape. Three leads 42 disposed on the same plane are provided on the rear face of the insulating frame 38.

Figure 4:
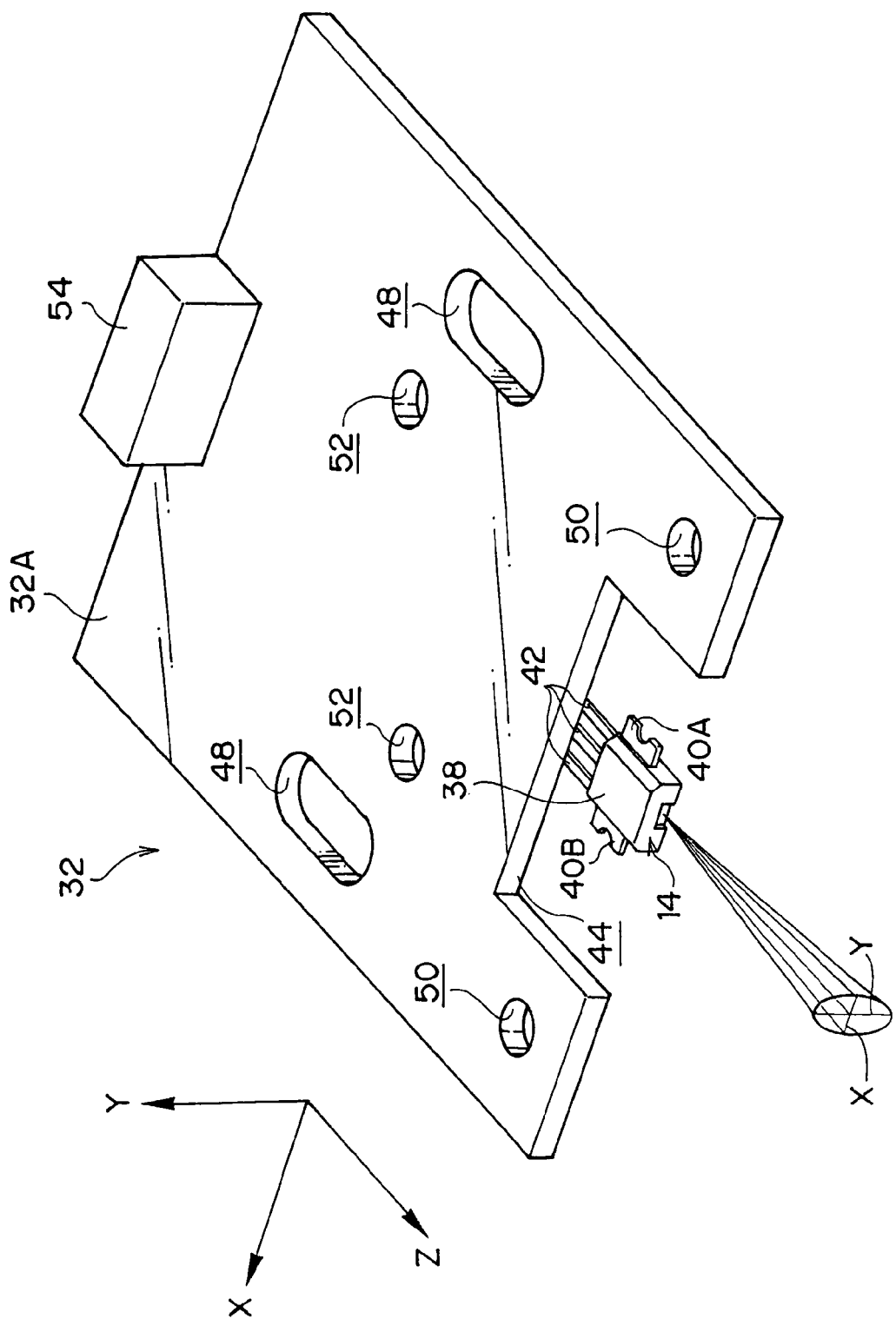
FIG. 4 is a perspective view showing a circuit board according to the first embodiment of the invention.

As shown in FIG. 4, a circuit board 32 is a plate member having an almost rectangular shape. A concave 44 for attaching the semiconductor laser 14 is formed on the front side of the circuit board 32. The three leads 42 of the semiconductor laser 14 housed in the concave 44 are soldered directly to the side of a solder face (in the embodiment, the under face in the diagram) of the circuit board 32. Consequently, the circuit board 32 is mounted so that the main scanning direction (X direction) can be parallel with a circuit board face 32A. The main scanning direction corresponds to the main scanning by the rotary polygonal mirror 20 including the optical axis in directions of vibration of outgoing light of the laser. Simultaneously, the mounting may result in that the sub scanning direction (Y direction) is perpendicular to the circuit board face 32A. The circuit board face 32A is orthogonal to the X direction including the optical axis in directions of vibration of outgoing light of the laser. By minimizing a positional deviation of the semiconductor laser 14 with respect to the circuit board 32 and maintaining the minimum positional deviation, the optical axis can be easily adjusted. In some cases, a jig may be employed for positioning and soldering.

In the circuit board 32, long holes 48 for attaching the circuit board 32 to bosses 46 of the base face 30A, mounting holes 50 for fixing the elastic member 34 and the angle member 36 to the circuit board 32, and jig holes 52 for a jig are formed. The jig holes 52 will be described later. A connector 54 for supplying a power source or the like is provided on the circuit board 32.

The elastic member 34 for holding the semiconductor laser 14 mounted on the circuit board 32 will now be described.

In the elastic member 34, as shown in FIG. 5, a pair of tongue pieces 58A and 58B bent downward and a pressing piece 60 are formed in the center portion of a plate member 56 of a rectangular shape. The pressing piece 60 is for sandwiching the lead frames 40A and 40B of the semiconductor laser 14 with the tongue pieces 58A and 58B.

The tongue piece 58A has a slope 62A inclined downward from the plate member 56, a horizontal portion 64A bent in parallel with the plate member 56 at the end of the slope 62A, and a supporting portion 66A bent upright at the end of the horizontal portion 64A. The tongue piece 58B is similarly formed to the tongue piece 58A.

The pressing piece 60 has a supporting portion 68 extending perpendicularly upward from the plate member 56, a horizontal portion 70 bent at a right angle from the end of the supporting portion 68, and a pair of pressing portions 72A and 72B. The pair of pressing portions 72A and 72B is bent perpendicularly downward at both sides of a widened portion at the end of the horizontal portion 70. Each of the pair of pressing portions 72A and 72B has a semicircular shape in a side view as shown in FIG. 6. A predetermined space is formed between the tip of the R face of the semicircular shape and each of the supporting portions 66A and 66B of the tongue pieces 58A and 58B.

Each of the space in the X direction between the supporting portions 66A and 66B of the pair of tongue pieces 58A and 58B and the space in the X direction between the pair of pressing portions 72A and 72B of the pressing piece 60 is set to be slightly larger than the width of the outer insulating frame 38 of the semiconductor laser 14.

At both end of the plate member 56, a pair of holes 74 for attaching the elastic member 34 to the circuit board 32 are formed.

The elastic member 34 constructed as described above is allowed to sandwich the semiconductor laser 14 mounted on the circuit board 32.

Figure 7:
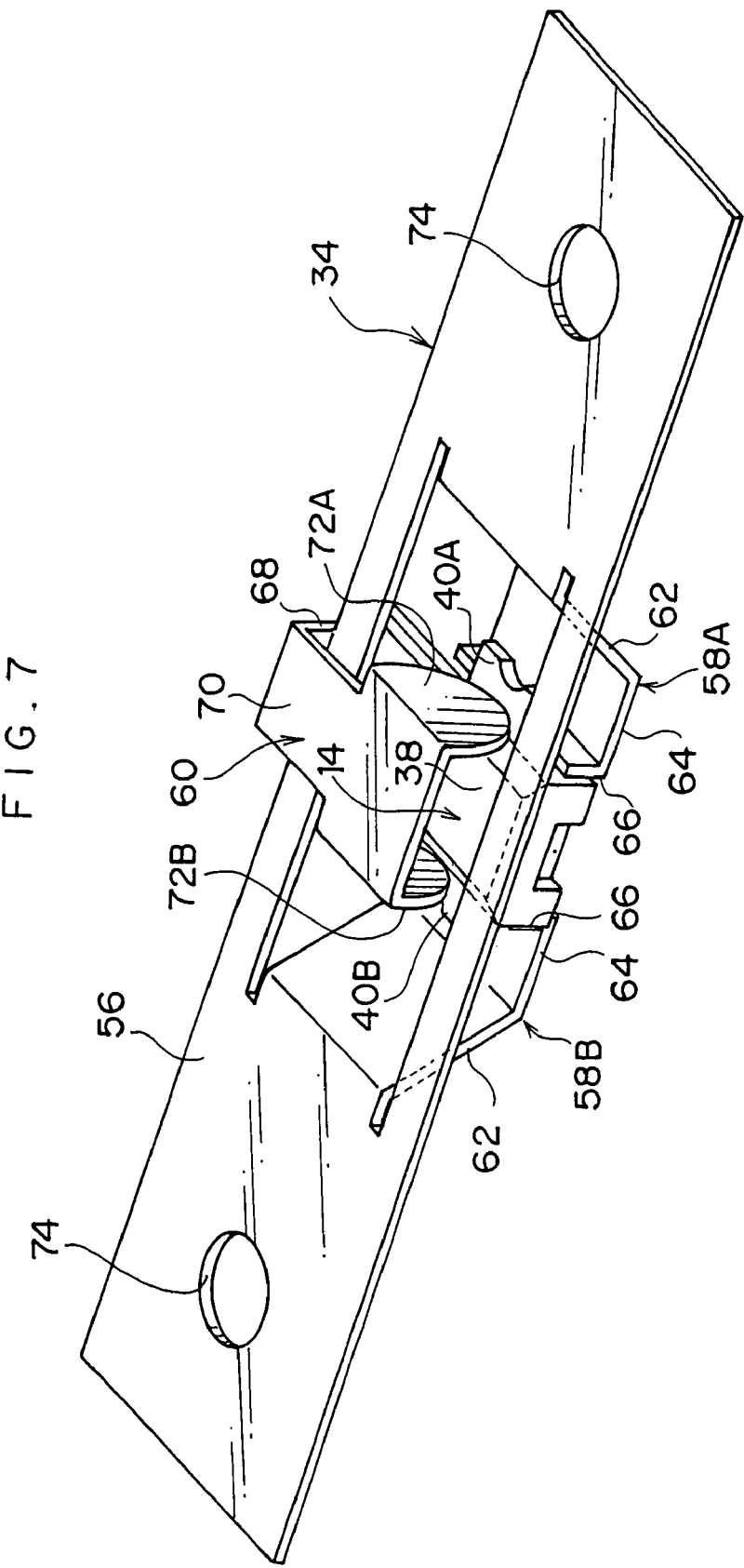
FIG. 7 is a perspective view illustrating a state of holding the semiconductor laser according to the first embodiment of the invention.
Figure 8:
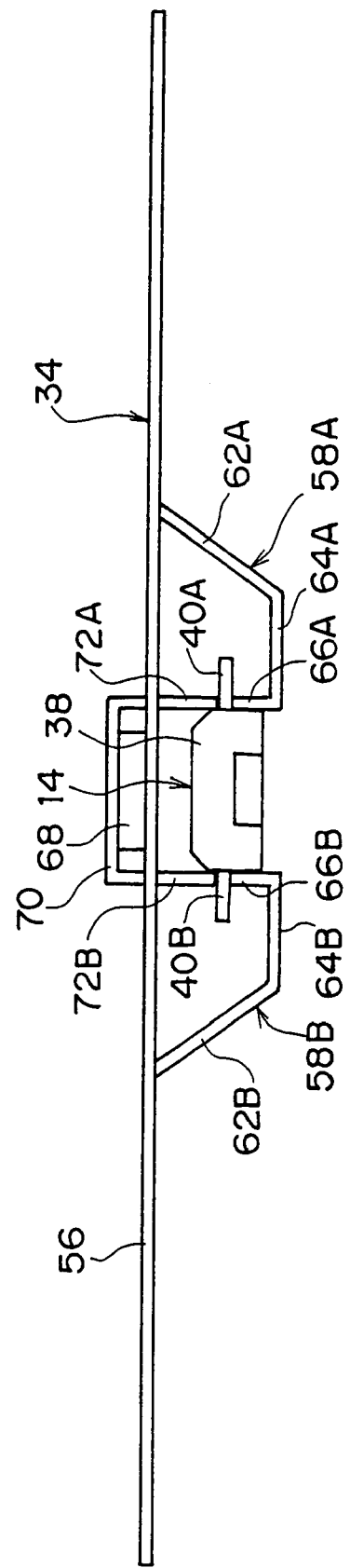
FIG. 8 is a front view illustrating a state of holding the semiconductor laser according to the first embodiment of the invention.
Figure 9:
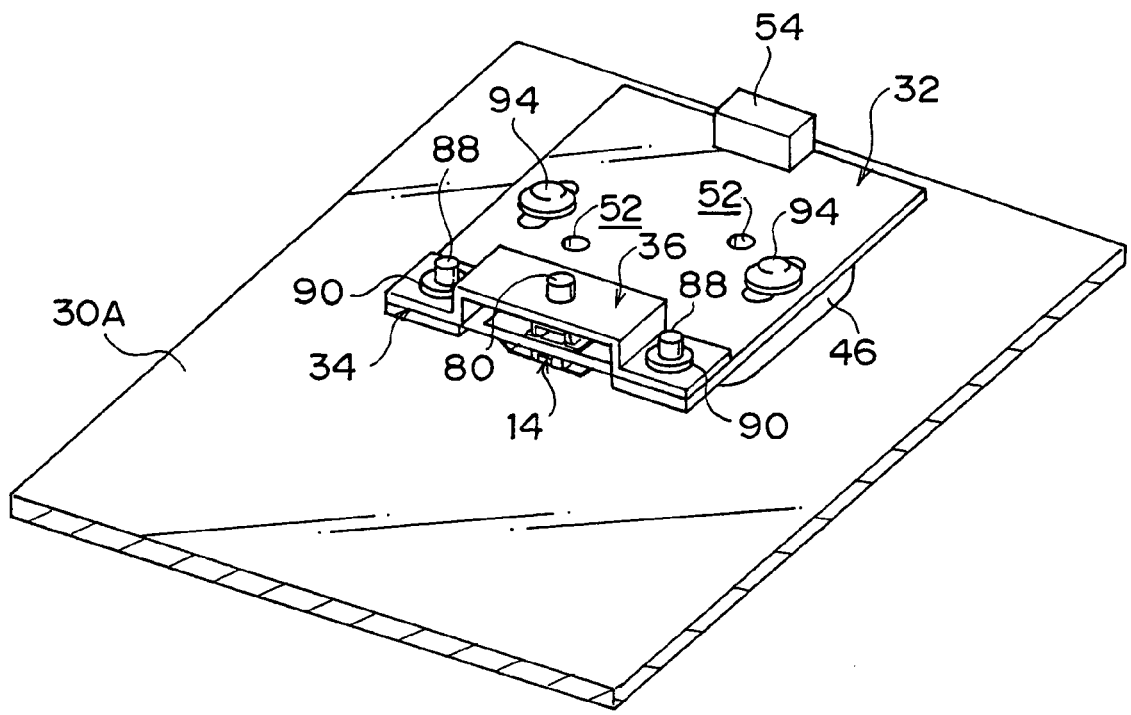
FIG. 9 is a perspective view showing an assembly state of light source according to the first embodiment of the invention.

Specifically, the outer insulating frame 38 of the semiconductor laser 14 is inserted into the space between the supporting portions 66A and 66B of the tongue pieces 58A and 58B of the elastic member 34 and between the pressing portions 72A and 72B of the pressing piece 60. As a result, as shown in FIGS. 6 to 8, the lead frames 40A and 40B of the semiconductor laser 14 are sandwiched by the supporting portions 66A and 66B of the tongue pieces 58A and 58B and the pressing portions 72A and 72B of the pressing piece 60, respectively. Because the configuration that the read frames 40A and 40B of the semiconductor laser 14 are sandwiched by the elastic member 34 is employed, at the time of holding the semiconductor laser 14, a load from the elastic member 34 acts on the opposing positions of the lead frames 40A and 40B made of a metal. No active load acts on the outer insulating frame 38 made of a resin. That is, by holding the semiconductor laser 14 by the elastic member 34, the light emitting element in the semiconductor laser 14 can be protected from a negative influence.

The angle member 36 and an adjusting screw 80 will now be described with reference to FIG. 2.

The angle member 36 has a center portion 82 into which the adjusting screw 80 to be described later is screwed in its center, and contact portions 84. The contact portions 84 are bent at both ends of the center portion 82 and are lower than the center portion by one stage.

In each of the contact portions 84, a hole 86 is provided. A male screw 88 which is inserted in a mounting hole 50 in the circuit board 32 from below of the circuit board 32 and the hole 74 in the elastic member 34 is inserted in the hole 86 and is screwed in a female screw 90, thereby integrating the circuit board 32, elastic member 34, and angle member 36 (refer to FIG. 9).

The head of the adjusting screw 80 provided at the center portion 82 is positioned on the center portion 82 and the tip 80A of the adjusting screw 80 is projected downward. When the angle member 36 is integrated with the circuit board 32 and the elastic member 34, the tip 80A of the adjusting screw 80 comes into contact with the top face of the pressing piece 60 of the elastic member 34 (refer to FIG. 6). In the optical axis adjustment, by rotating the adjusting screw 80 to move in the vertical direction, adjustment of the Y direction of the optical axis (hereinbelow, called Y adjustment) can be performed. The position of pressing the pressing piece 60 by the tip 80A of the adjusting screw 80 in the angle member 36 and that in the elastic member 34 are symmetrical to each other in plan view. By making the load act on the pressing piece 60 in the position of the center of gravity, the load is applied uniformly to the semiconductor laser 14 (lead frames 40A and 40B).

Figure 2:
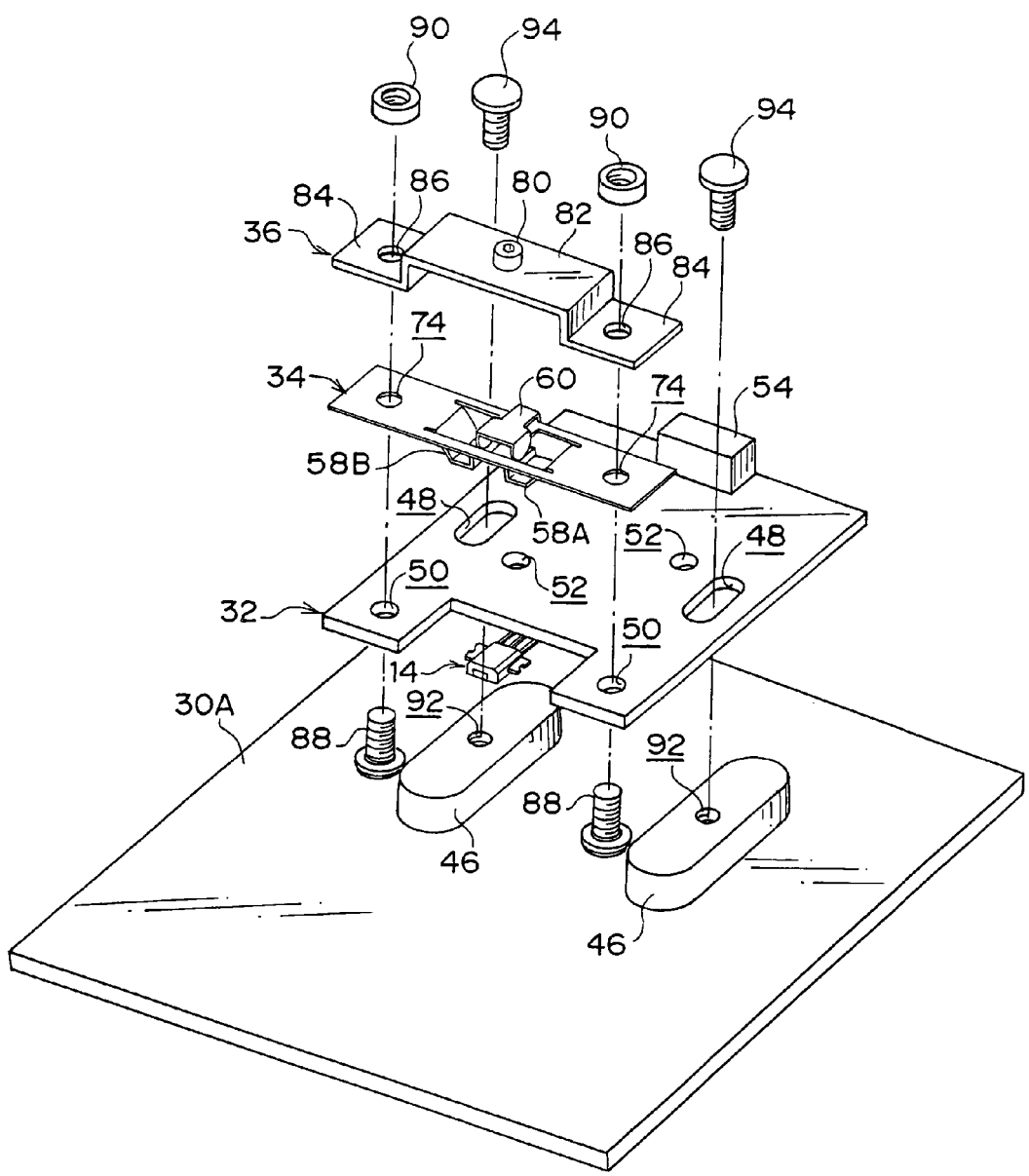
FIG. 2 is an exploded perspective view showing light source according to the first embodiment of the invention.

As shown in FIG. 2, two bosses 46 for mounting the board, of which top faces are parallel to the main scanning face are provided on the base face 30A of the optical box 30.

In the top face of each of the bosses 46, a screw hole 92 for attaching the board is formed. When a screw 94 inserted in the long hole 48 in the circuit board 32 is screwed in the screw hole 94, the circuit board 32 becomes parallel to the main scanning face and is attached to the bosses 46 (refer to FIG. 9).

Method of Adjusting Optical Axis of Light Source

The optical axis adjustment and a jig used for optical axis adjustment will now be described. A schematic configuration of an adjusting jig will be described but a mechanism of sliding the adjusting jig in the X and Y directions will not be described.

Figure 10:
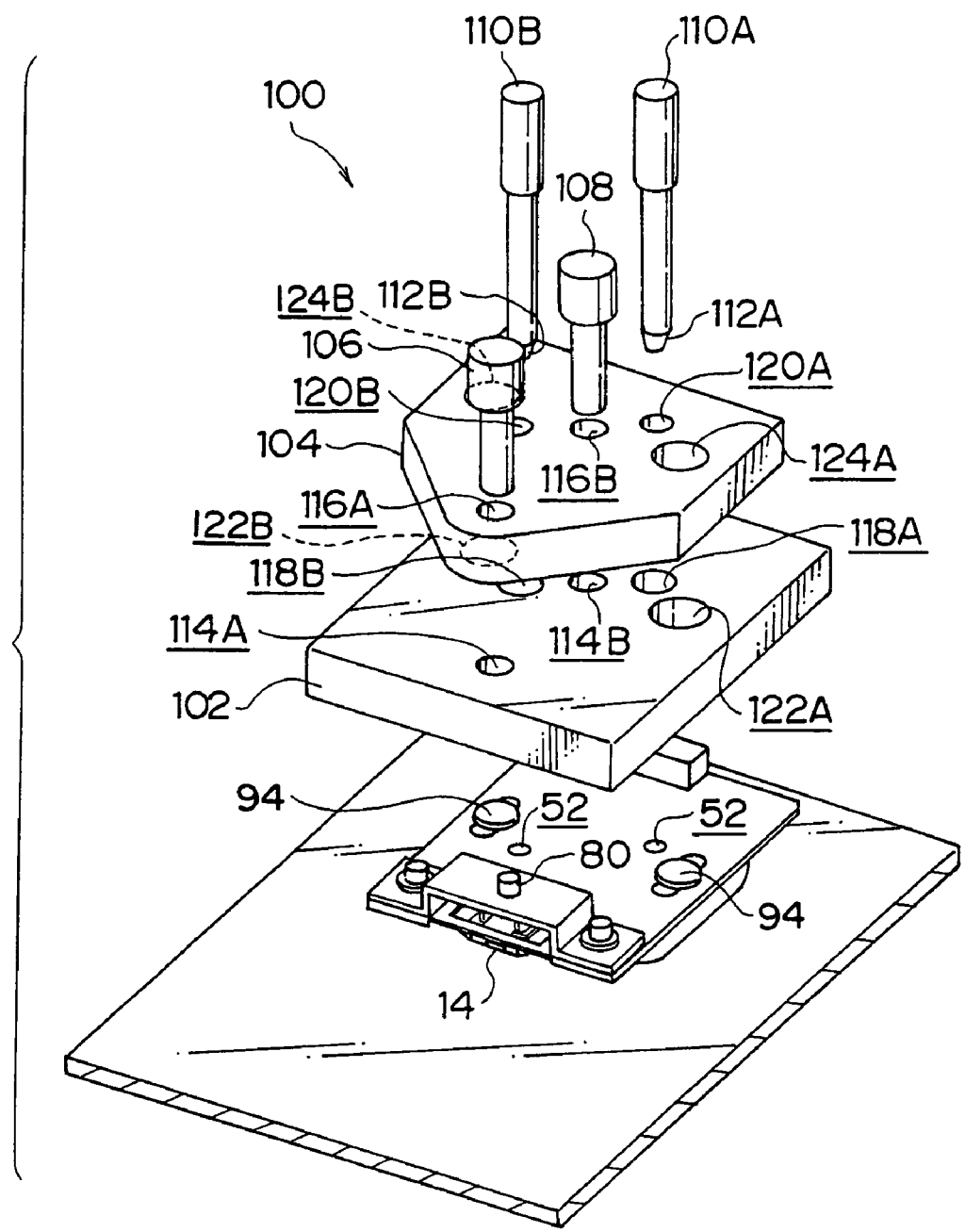
FIG. 10 is an exploded perspective view showing an adjusting jig according to the first embodiment of the invention.
Figure 11:
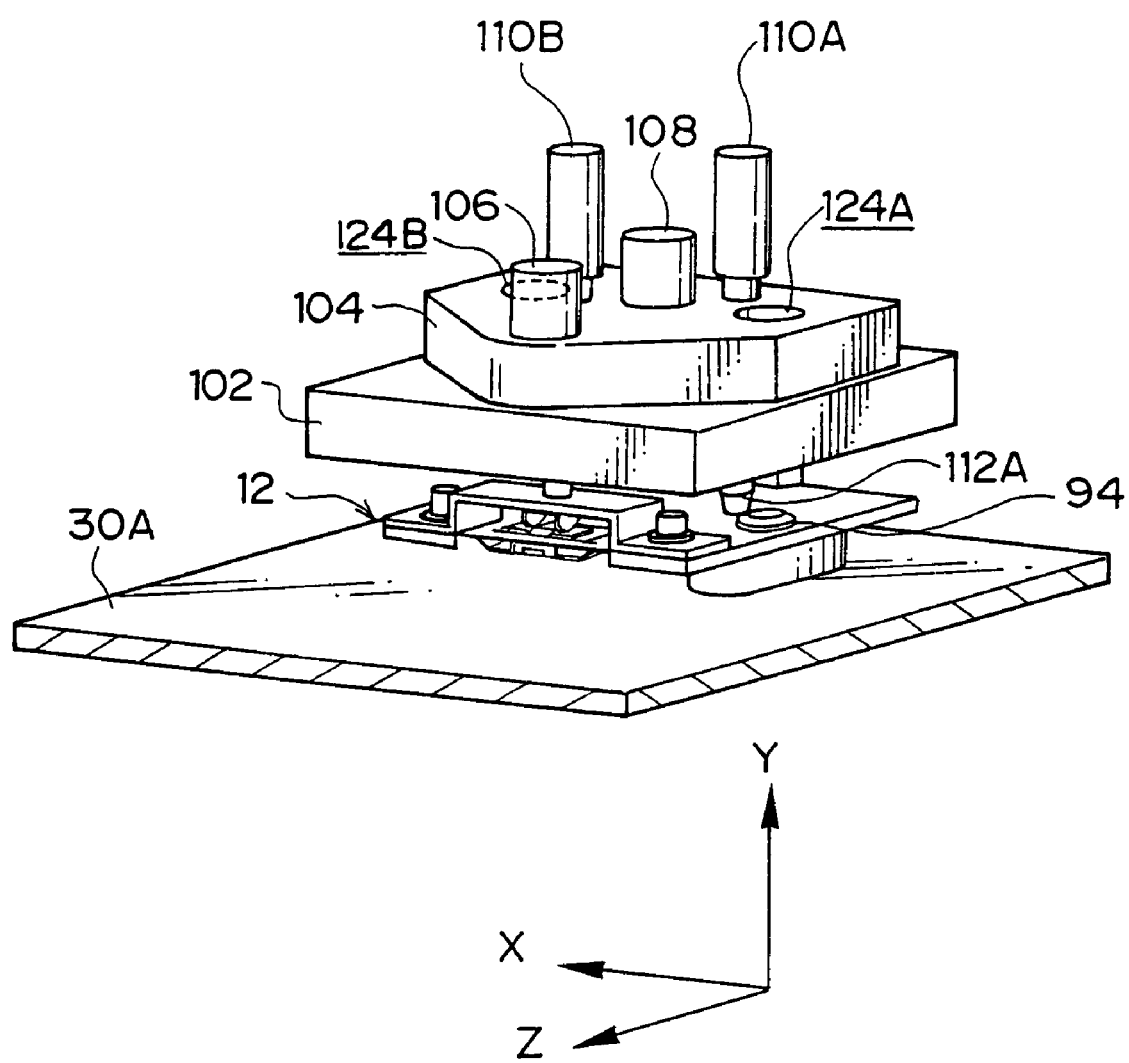
FIG. 11 is a perspective view showing a state where the adjusting jig is set to the light source according to the first embodiment of the invention.
Figure 12:
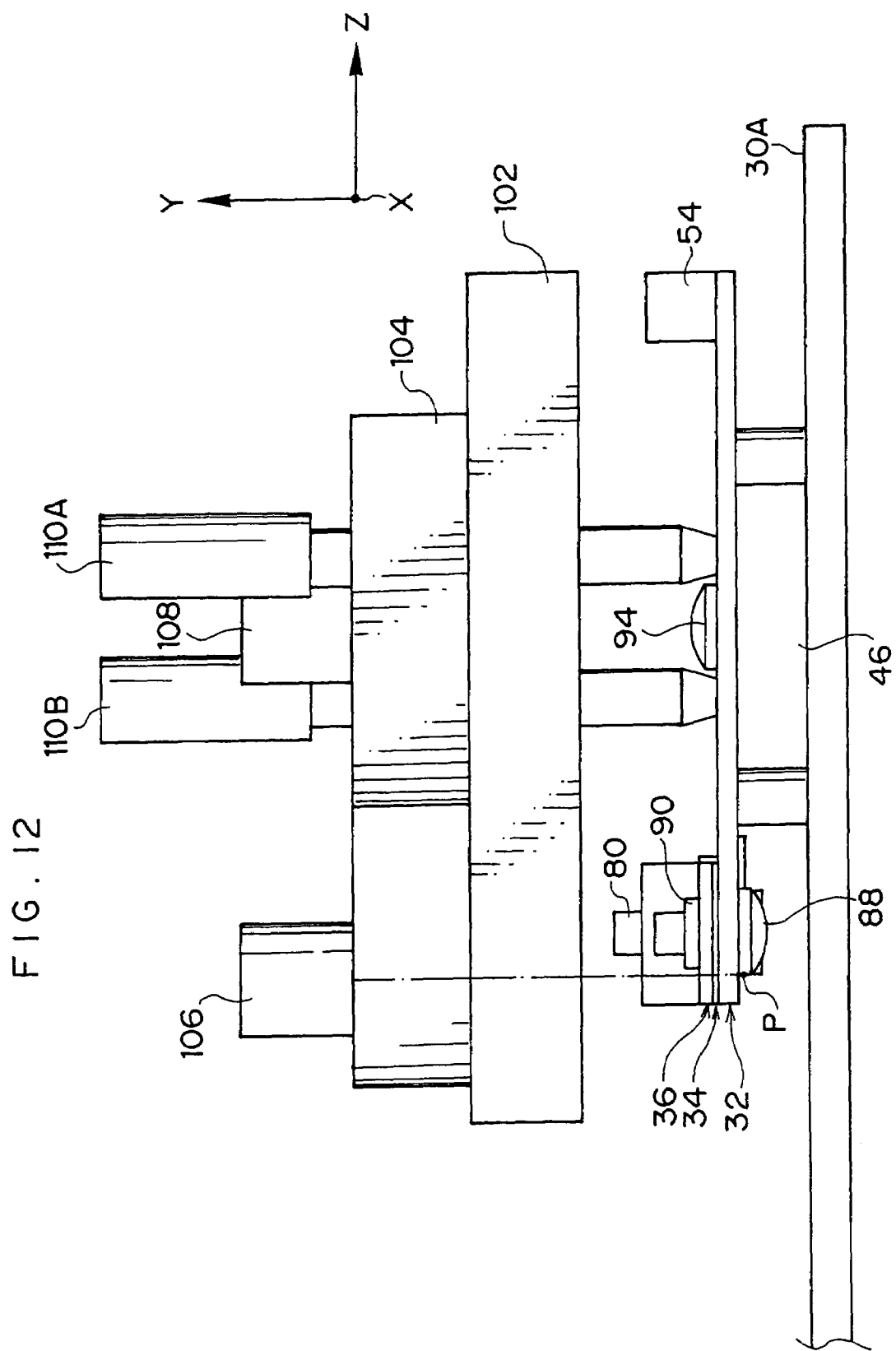
FIG. 12 is a side view showing a state where the adjusting jig is set to the light source according to the first embodiment of the invention.
Figure 13:
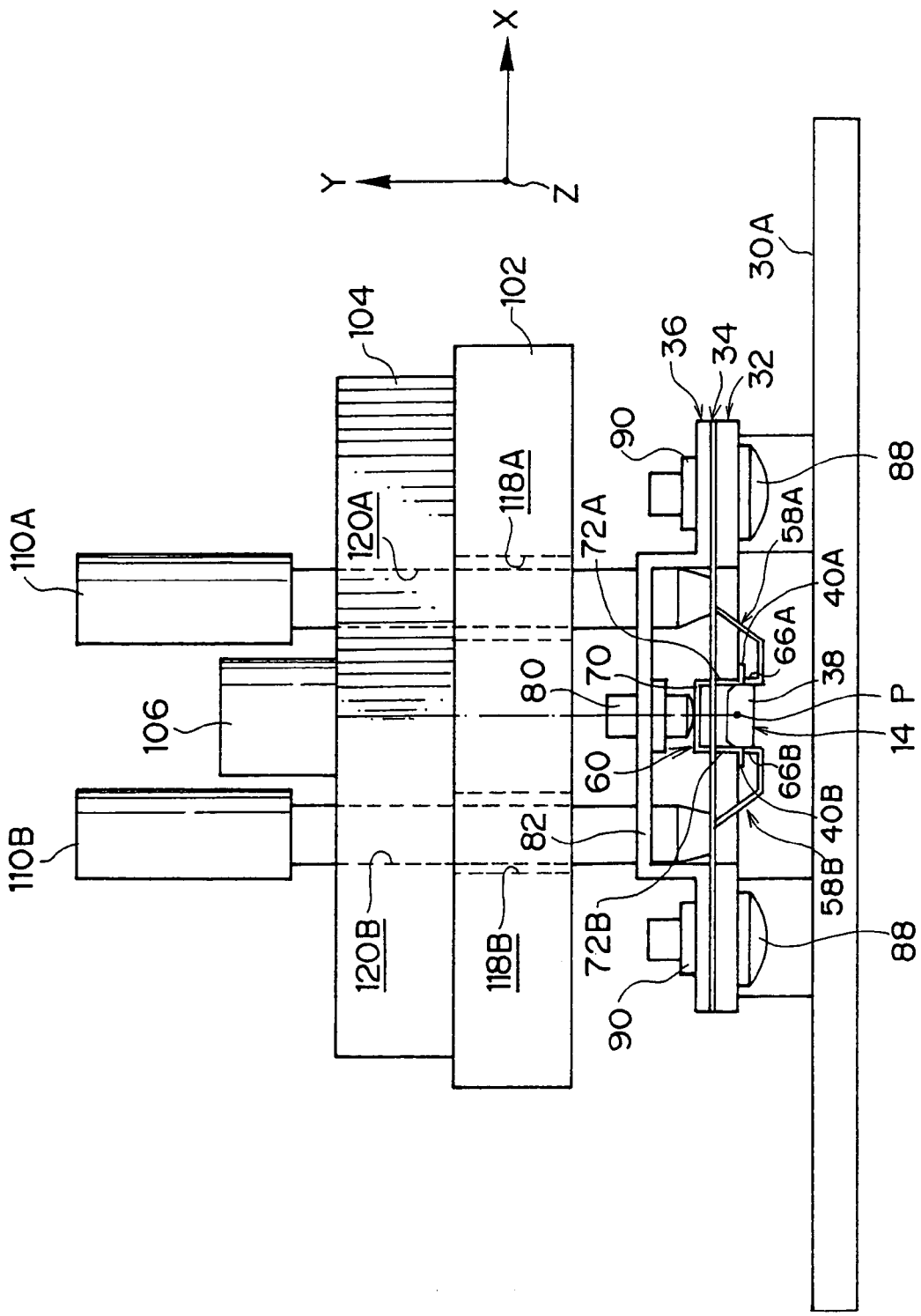
FIG. 13 is a front view showing a state where the adjusting jig is set to the light source according to the first embodiment of the invention.
Figure 14A:
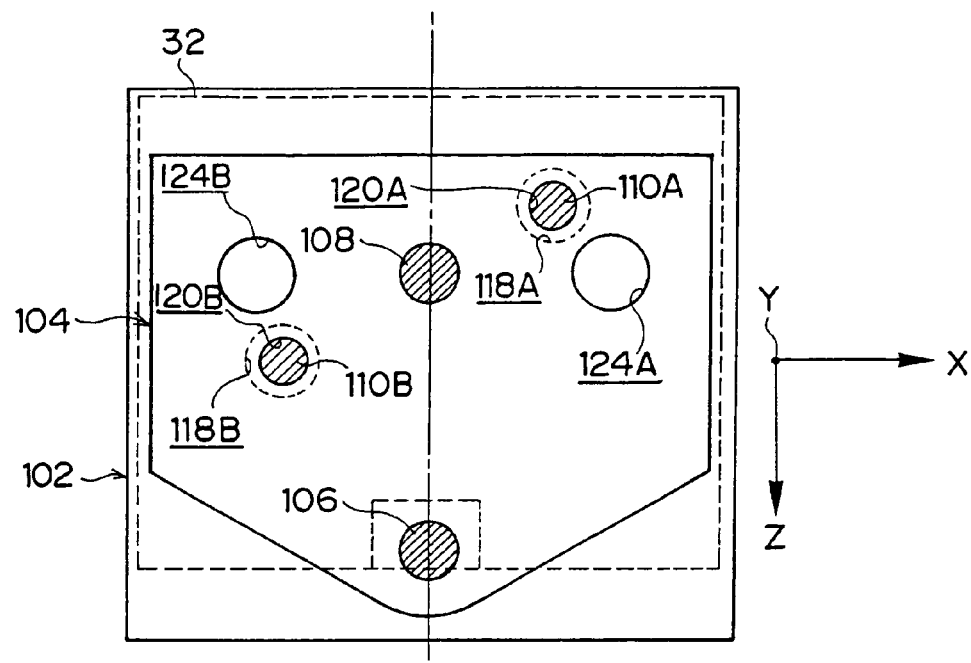
FIG. 14A is a schematic diagram showing a state before θ adjustment made by the adjusting jig according to the first embodiment of the invention.
Figure 14B:
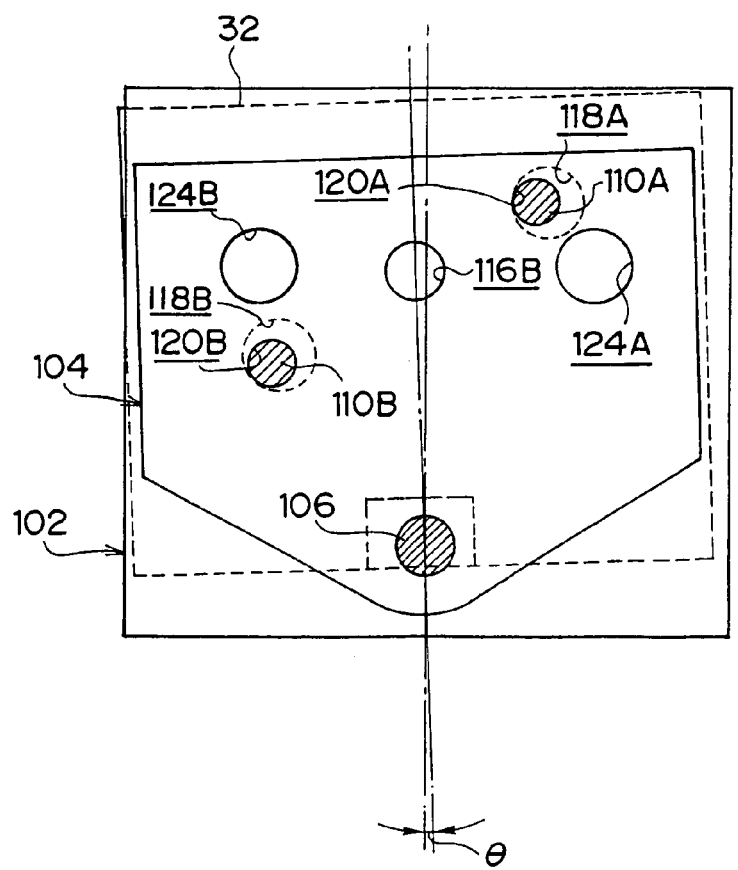
FIG. 14B is a schematic diagram showing a state after θ adjustment made by the adjusting jig according to the first embodiment of the invention.

An adjusting jig 100 is, as shown in FIG. 10, basically has an XY plate 102, a θ plate 104, a fulcrum pin 106, a fixing pin 108, and a pair of set pins 110A and 110B.

Each of the fulcrum pin 106, fixing pin 108, and set pins 110A and 110B has an enlarged head portion. When the pins are inserted from above (from the θ plate 104 side) in a state where the XY plate 102 and the θ plate 104 are stacked, the tip of each of the pins is stopped at a predetermined position. At the tips of the set pins 110A and 10B, tapered portions 112A and 112B with decreasing diameters are formed respectively so that the tips can be inserted into the jig holes 52 in the circuit board 32.

Holes 114A and 114B are formed in the XY plate 102, and holes 116A and 116B are formed in the θ plate 104. When the fulcrum pin 106 and the fixing pin 108 are inserted into the holes 114A and 114B and the holes 116A and 116B, the XY plate 102 and the θ plate 104 are securely fixed (see FIGS. 11 and 12).

A pair of holes 118A and 118B is formed in the XY plate 102. A pair of holes 120A and 120B is formed in the θ plate 104. By inserting the set pins 110A and 110B and inserting the tapered portions 112A and 112B at the tips into the jig holes 52 formed in the circuit board 32, the adjusting jig 100 and the circuit board 32 are made integrally operable. The diameter of each of the holes 118A and 118B in the XY plate 102 is set to be larger than that of each of the set pins 110A and 110B. The set pins 110A and 110B are movable in the holes 118A and 118B (refer to FIG. 14A). The diameter of each of the holes 120A and 120B in the θ plate 104 is set to be nearly equal to that of each of the set pins 110A and 110B.

Further, tool holes 122A and 122B are formed in the XY plate 102 and tool holes 124A and 124B are formed in the θ plate 104. In a state where the adjusting jig 100 is disposed on the light source 12, a tool can be inserted from above of the adjusting jig 100 and turn the screw 94 on the circuit board 32.

A method of adjusting the optical axis of the light source 12 by using the adjusting jig 100 will be described.

First, the optical axis is adjusted in the X and Z directions (hereinbelow, called an X adjustment and a Z adjustment). Specifically, the XY plate 102 and the θ plate 104 are stacked. The fulcrum pin 106 is inserted into the holes 116A and 114A. The fixing pin 108 is inserted into the holes 116B and 114B thereby securely fixing the XY plate 102 and the θ plate 104 and setting the adjusting jig 100. Next, the pair of set pins 110A and 110B is inserted into the holes 120A and 120B in the θ plate 104 and the holes 118A and 118B in the XY plate 102. The tapered portions 112A and 112B are inserted into the jig holes 52 in the circuit board 32. As a result, the jig 100 and the light source 12 are made integrally movable.

In the state, the adjusting jig 100 is moved together with the light source 12 in the X and Z directions. When the optical axis reaches the predetermined position, this moving stops. As a result, the light source 12 is positioned in the X and Z directions.

Further, if adjustment of the optical axis angle θ (hereinbelow, called θ adjustment) is necessary, the fixing pin 108 is pulled out from the holes 114B and 116B. The circuit board 32 is turned together with the θ plate 104 only by θ around the fulcrum pin 106 as a center (rotary axis) in the main scanning direction (see FIGS. 14A and 14B) thereby making the θ adjustment of the optical axis of outgoing light of the semiconductor laser 14.

In this case, the set pins 110A and 110B are securely inserted in the holes 120A and 120B. The pins are movable in the holes 118A and 118B. The θ plate 104 turns together with the circuit board 32 with respect to the XY plate 102.

A tool is inserted from the tool holes 124 (124B) and 122A (122B) of the adjusting jig 100 and the screws 94 are fastened. In this way, the optical axis in the X, Z, and θ directions of the light source 12 can be adjusted.

At this time, the fulcrum pin 106 is positioned on a light emission point P of the semiconductor laser 14 (refer to FIGS. 12 and 13) so that a positional deviation from the adjusted state in the X and Z directions can be prevented. Consequently, without returning to upstream of a process, the adjustment can be finished. In the adjustment process, the θ adjustment may be done firstly and after this, the X adjustment and the Z adjustment may be done.

Subsequently, when making an adjustment in the Y direction (hereinbelow, called Y adjustment), the adjustment is carried out as follows. The adjusting jig 100 is taken from the light source 12. The adjusting screw 80 is rotated to vertically move the tip 80A. The pressing piece 60 of the elastic member 34 pressed by the tip 80A is displaced. One requirement here is to maintain the preliminarily performed adjustment (X, Z, and θ adjustment) state. The movement of the semiconductor laser 14 in this case will be described with reference to the Y adjustment conceptual diagram of FIG. 15.

Figure 15:
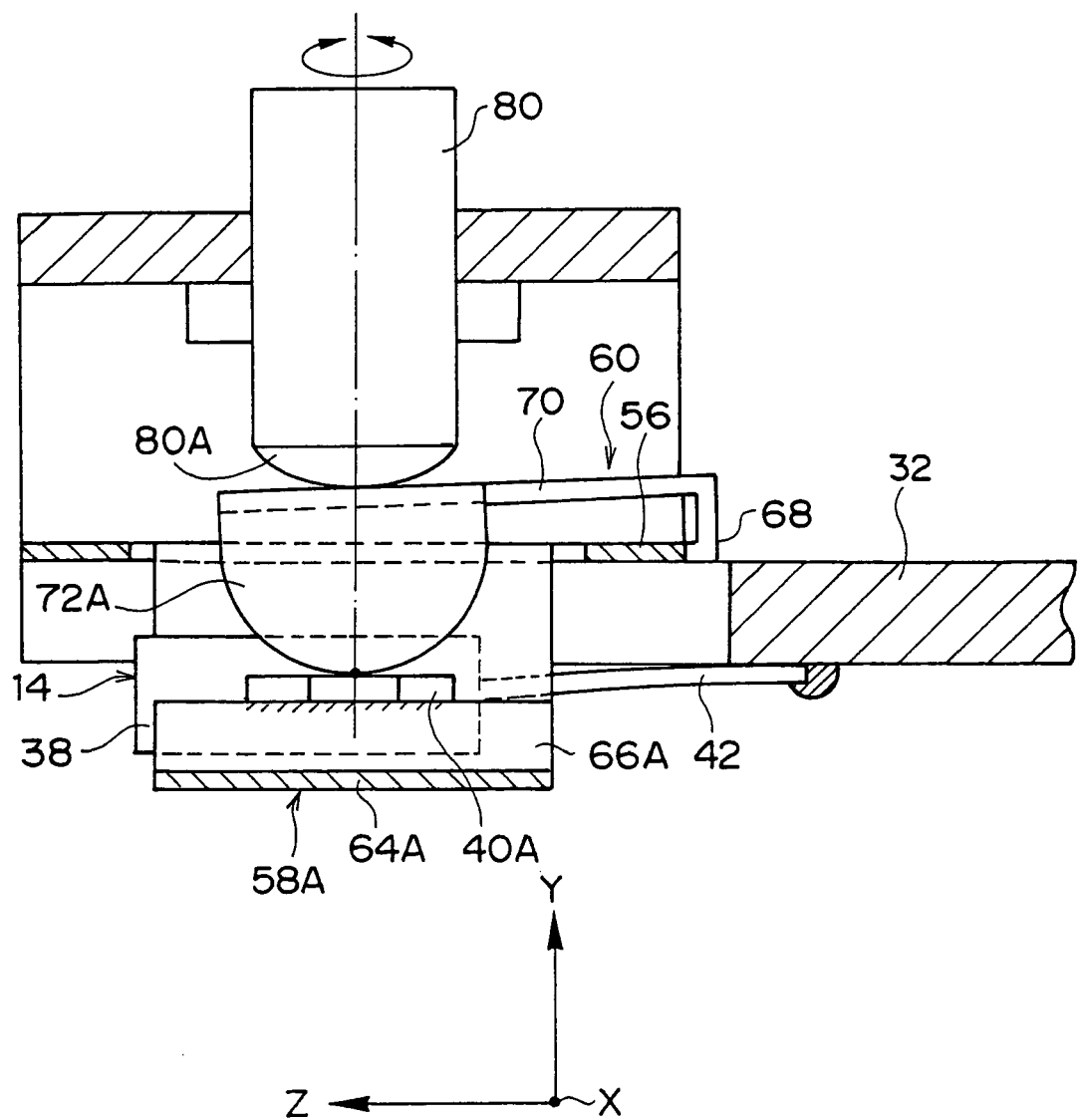
FIG. 15 is a diagram showing a state of Y adjustment according to the first embodiment of the invention.

FIG. 15 is a diagram showing a state where the semiconductor laser 14 is moved slightly downward by rotation of the adjusting screw 80. The semiconductor laser 14 is directly mounted on the circuit board 32. Although flexibility is regulated, the semiconductor laser 14 is freely supported by the tongue pieces 58A and 58B and the pressing piece 60 constructed to sandwich the lead frames 40A and 40B of the semiconductor laser 14 in the vertical direction. By forming each of the pressing portions 72A and 72B of the pressing piece 60 in an R shape, irrespective of an elastic deformed state of the pressing piece 60, the pressing portions 72A and 27B are in point-contact (point-pressing) with the top faces of the lead frames 40A and 40B. Irrespective of elastic deformation, the tongue pieces 58A and 58B can assure the horizontal state of the portions (line receiving portions) of supporting the under faces of the lead frames 40A and 40B of the supporting portions 66A and 66B. Accordingly, the semiconductor laser 14 moves in the vertical direction while maintaining the horizontal state by the rotation of the adjusting screw 80. Particularly, as the movement range in the Y direction, in the optical scanner of the invention, about ±1 mm of a nominal is sufficient on the photosensitive member. In the semiconductor laser 14 itself, ±0.2 mm of the sensitivity of the optical system is sufficient. Even when the semiconductor laser 14 is directly mounted on the circuit board 32, deformation of the leads 42 can be absorbed and the Y adjustment can be made without causing a solder crack.

Figure 16:
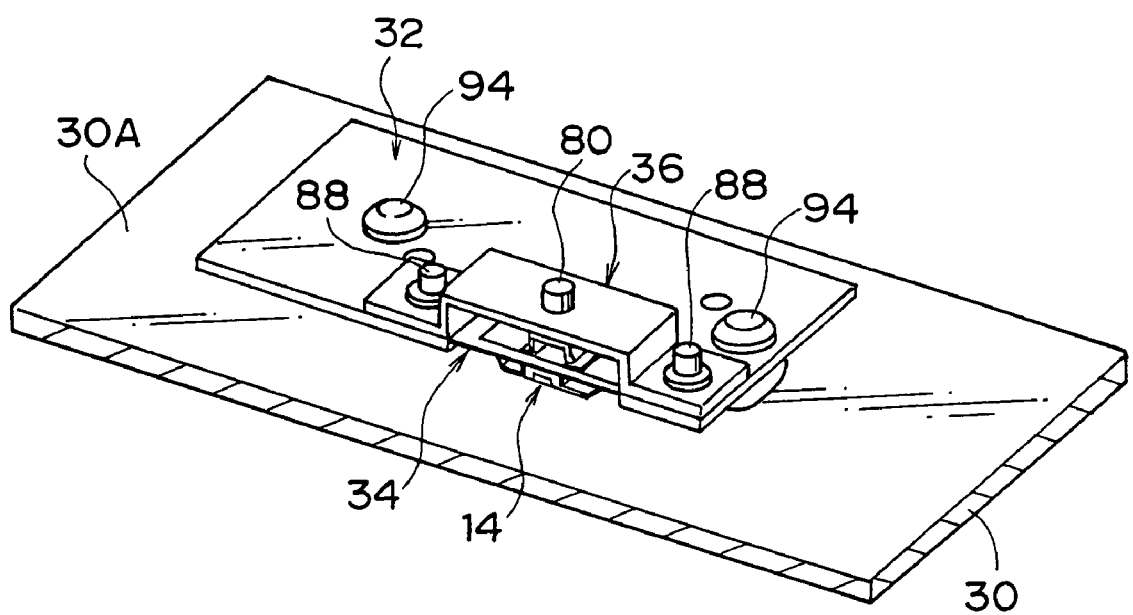
FIG. 16 is a perspective view showing variations of the light source according to the first embodiment of the invention.

Although the semiconductor laser 14 is disposed in the center portion in the X direction of the circuit board 32 of the light source 12 in this embodiment, the semiconductor laser 14 can be disposed in an arbitrary position in accordance with layout requirements in the optical box 30. For example, as shown in FIG. 16, the semiconductor laser 14 can be disposed on an end side in the X direction of the circuit board 32. By disposing the semiconductor laser 14 in an arbitrary position on the circuit board 32, the position and shape optimum to attachment to the optical box 30 can be selected.

The semiconductor laser 14 is attached to the light source 12 of the embodiment for guiding the optical axis of outgoing light parallel to the circuit board 32. The circuit board 32 is attached to the base face 30A of the optical box 30 so as to be parallel to the base face 30A, thereby enabling the optical axis adjustment to be easily made.

Figure 19:
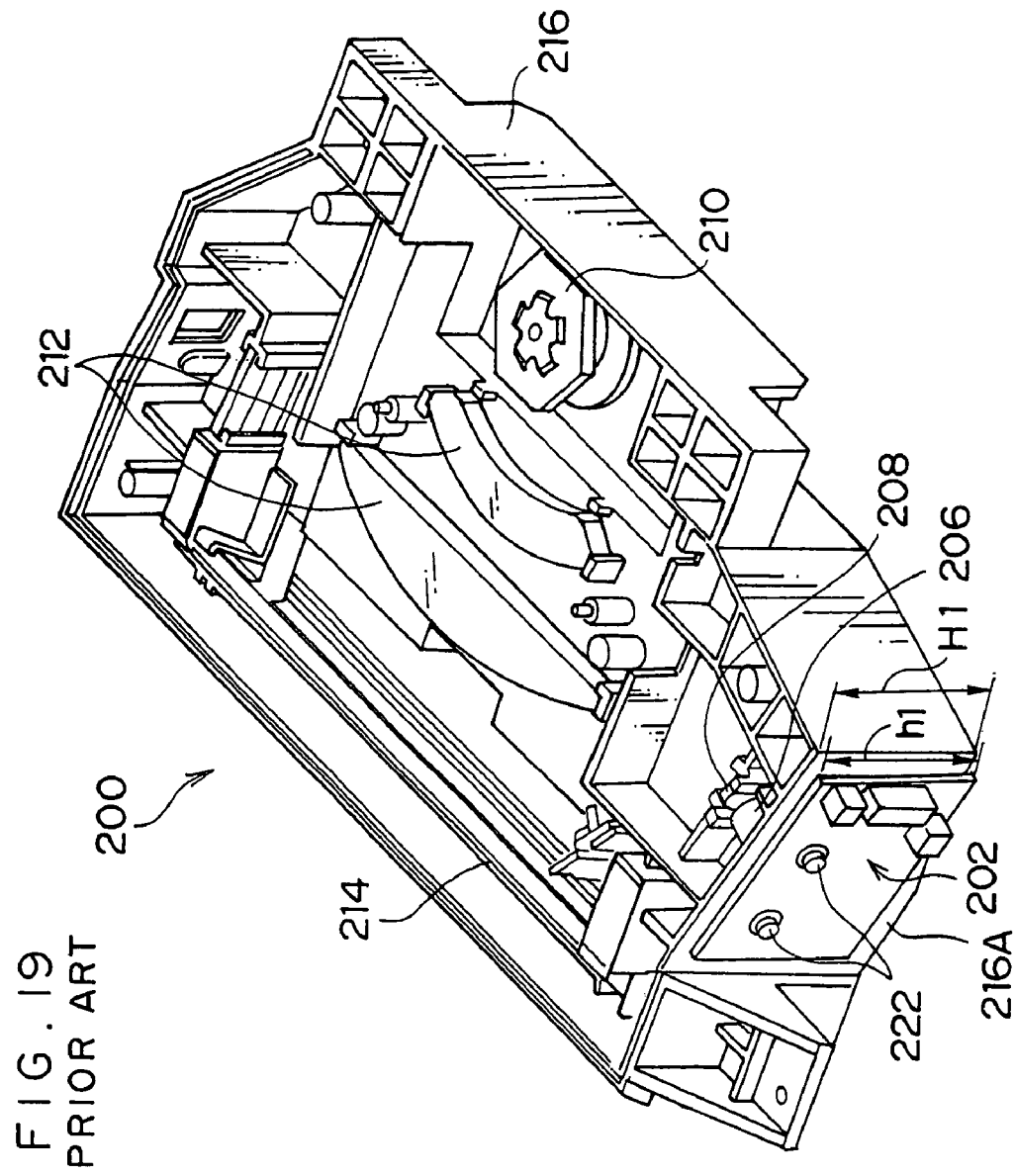
FIG. 19 is a perspective view of an optical scanner according to a conventional technique 1.
Figure 20:
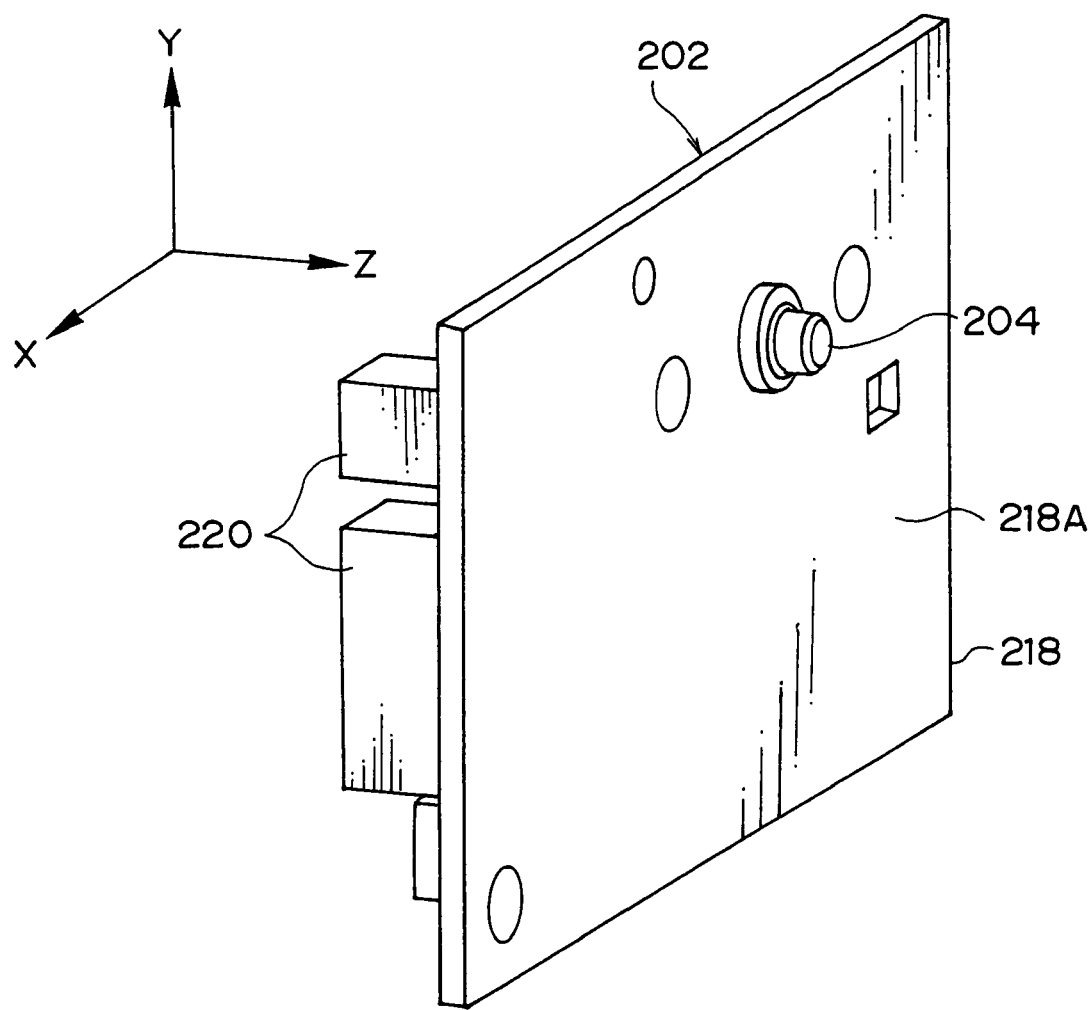
FIG. 20 is a perspective view of the optical scanner according to the conventional technique 1.
Figure 21:
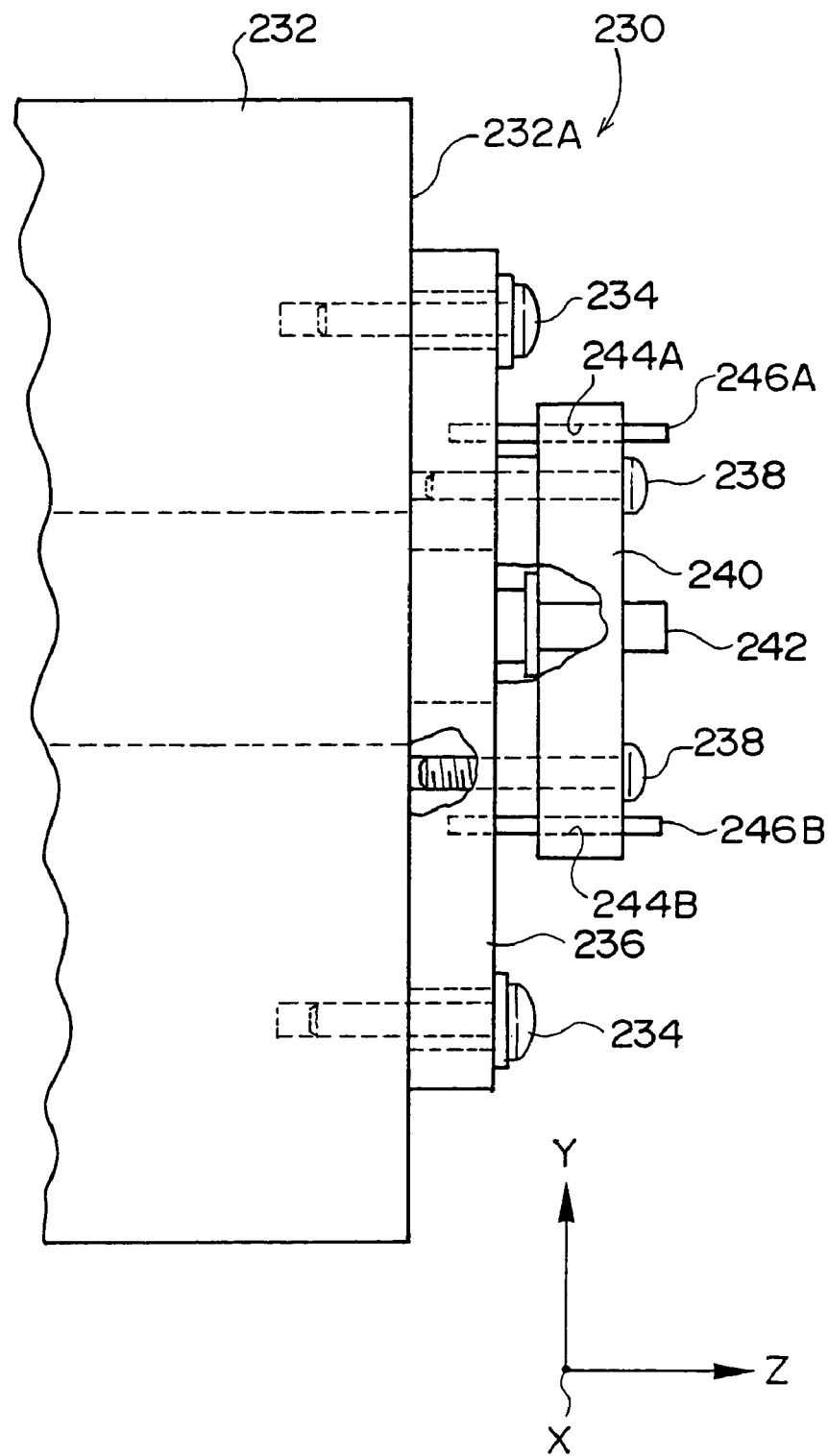
FIG. 21 is a side view of main components of light source according to a conventional technique 2.
Figure 22:
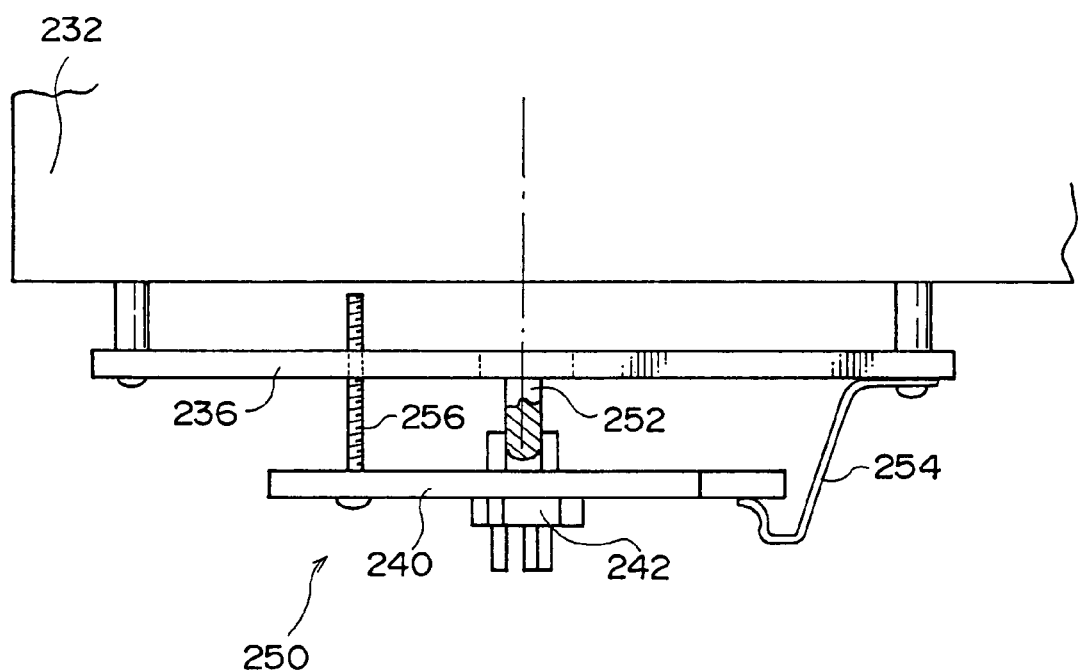
FIG. 22 is a diagram showing a state before adjusting the optical axis of light source according to a conventional technique 3.
Figure 23:
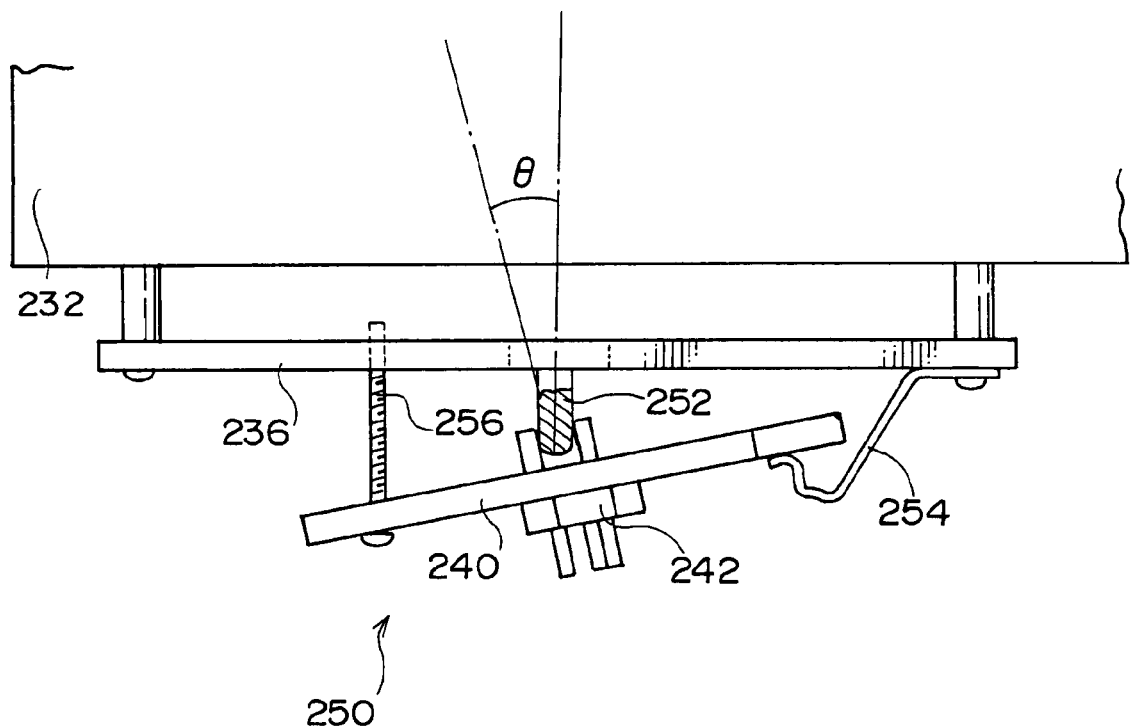
FIG. 23 is a diagram showing a state after adjusting the optical axis of the light source according to the conventional technique 3.
Figure 24:
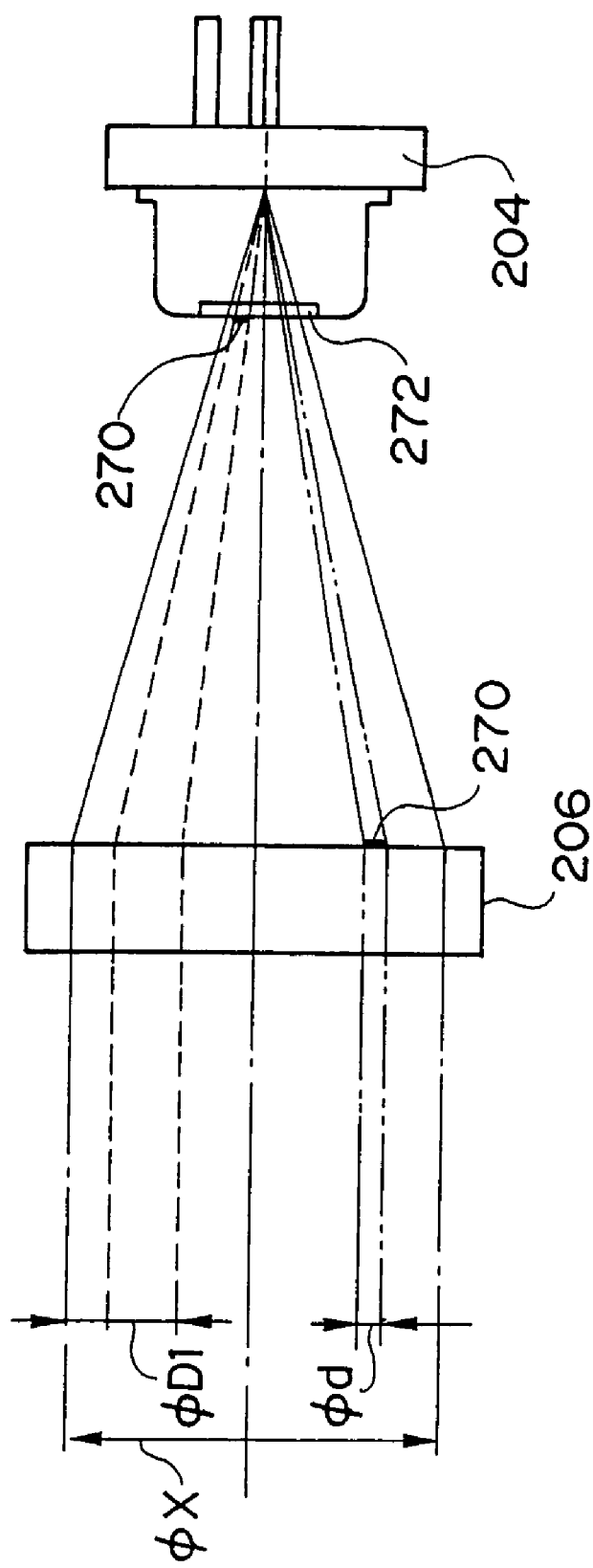
FIG. 24 is an explanatory diagram of influences exerted by adhesion of dusts.

The circuit board 32 is attached to the base face 30A of the optical box 30. As compared with the case where the circuit board 32 is attached to an external wall 30B of the optical box 30, the height H2 (refer to FIG. 1) of the optical box 30 can be lowered (H1>H2 (refer to FIG. 19)). In the case of attaching the circuit board 32 to the external wall 30B, the height H1 (refer to FIG. 19) of the external wall 30B is designated to be larger than the length of the circuit board 32 so as to prevent the optical axis adjustment from being disturbed by a contact with the circuit board 32.

Further, the configuration of attaching the light source 12 (circuit board 32) to the base face 30A is employed. As compared with the configuration of attaching the circuit board 32 to the side wall 30B of the optical box 30, deviation of the optical axis caused by deformation due to temperature rise is eliminated. A reason is as follows. The base face 30A of the optical box 30 is screwed to the body frame. When the optical box 30 deforms due to different coefficients of thermal expansion of the optical box 30 and the body frame, the side wall 30B will deform greater. The side wall 30B whose portion upper than the base face 30A in which deformation is restricted by screwing to the body frame.

Further, also at the time of optical axis adjustment, only by taking the cover of the optical box 30 away, all of optical axis adjustments can be carried out. Specifically, only by disposing the adjusting jig 100 on the light source 12 and moving the XY plate 102 and the θ plate 104 from above, the X adjustment, Z adjustment, and θ adjustment can be performed. Only by taking out the adjusting jig 100 and rotating the adjusting screw 80 from above, the Y adjustment can be performed. In this way, the operability of the optical axis adjustments is improved.

Further, because the light source 12 is disposed in the optical box 30 which is almost hermetically sealed by the cover, even in the case of using the low-cost light emitting device open-type semiconductor laser 14, deterioration in picture quality due to adhesion of dusts on the semiconductor laser 14 and electrostatic destruction of the semiconductor laser 14 can be prevented. An optical scanning with high picture quality can be performed by the low-cost light source 12.

Because the configuration of adjusting the optical axis by the jig 100 and the adjusting screw 80 is employed, the number of parts necessary for the light source 12 is reduced. Lower cost of the light source 12 can be achieved.

Second Embodiment

A light source according to a second embodiment of the invention will now be described. Components similar to those of the first embodiment are designated by the same reference numerals and their detailed description will not be repeated.

Figure 17:
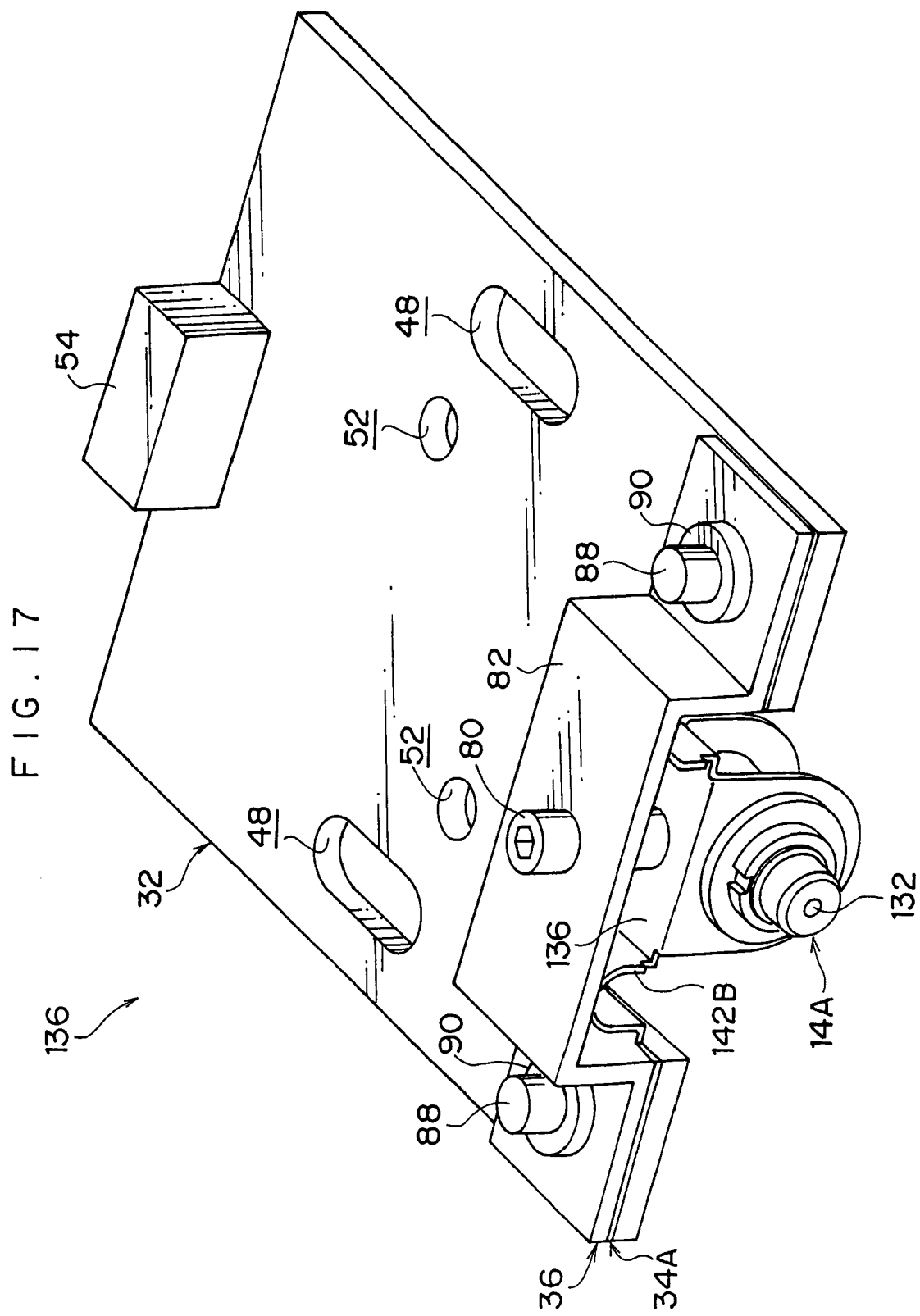
FIG. 17 is a perspective view showing light source according to a second embodiment of the invention.

As shown in FIG. 17, a semiconductor laser 14A used for light source 130 has an appearance of a metal cylindrical semiconductor laser. In the semiconductor laser 14A, a cover glass of an outgoing beam window 132 is removed to aim at reducing cost. In the second embodiment, the semiconductor laser 14A is used as a kind of the light emitting device open-type semiconductor laser.

The semiconductor laser 14A is used so as to be inserted in an LD socket 134. The LD socket 134 is held by an elastic member 34A.

Figure 18:
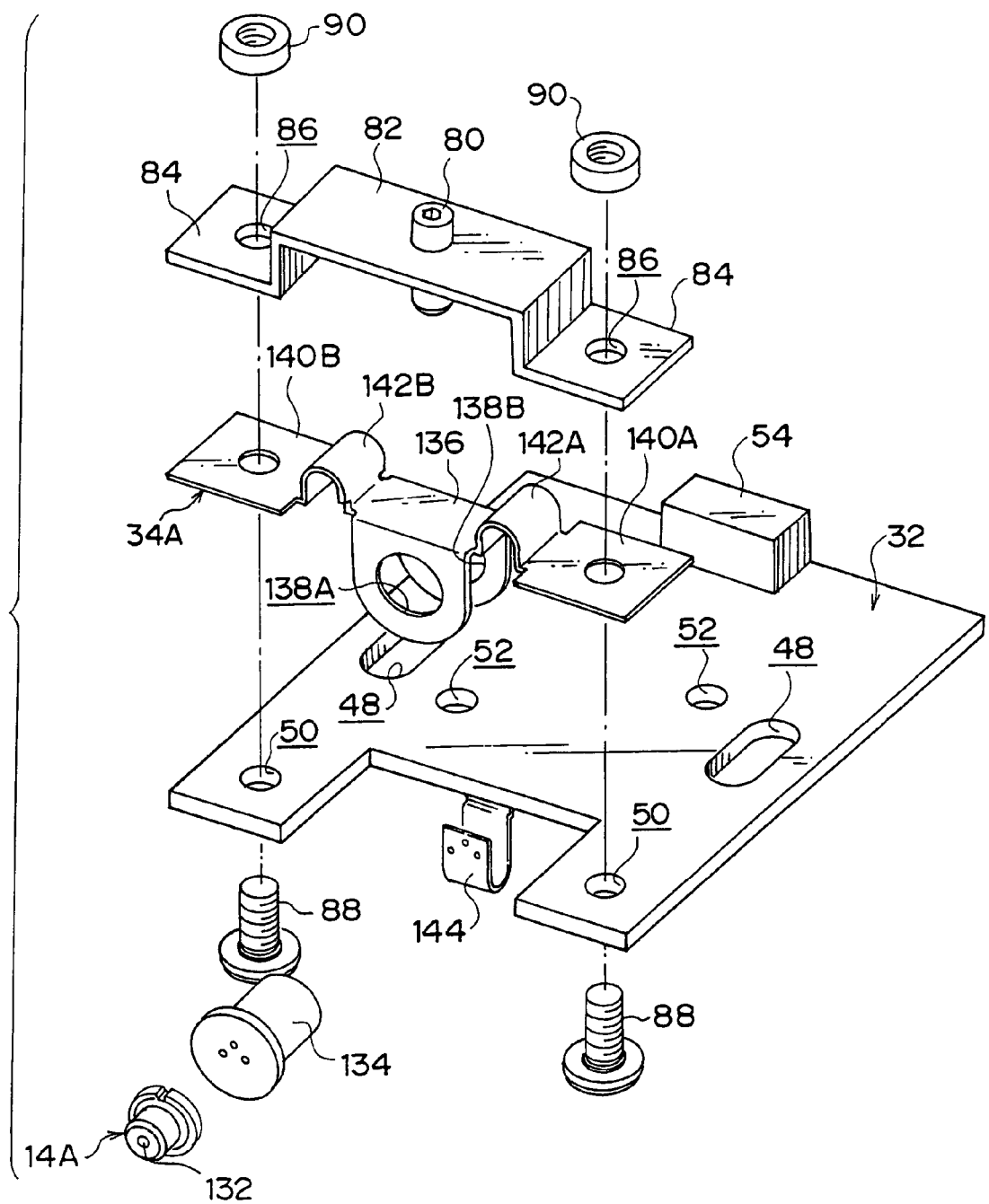
FIG. 18 is an exploded perspective view showing the light source according to the second embodiment of the invention.

In the elastic member 34A, through holes 138A and 138B for holding the LD socket 134 are formed in a center portion 136 as shown in FIG. 18. The center portion 136 is connected to both sides 140A and 140B via bridge portions 142A and 142B.

The lead of the LD socket 134 which is press-fit in the through holes 138A and 138B of the elastic member 34A is connected to the circuit board 32 via a flexible printed circuit (FPC) 144.

In the light source 130 constructed as described above, by using the adjusting jig 100, the X adjustment and the Z adjustment and, as necessary, the θ adjustment can be performed in a manner similar to the first embodiment.

In the case of making the Y adjustment, by rotating the adjusting screw 80 of the angle member 36, the bridge portions 142A and 142B disposed symmetrical are just elastically deformed. Thus, the horizontal state of the center portion 136 (semiconductor laser 14) of the elastic member 34A can be maintained.

As a result, effects similar to those of the first embodiment can be produced.

According to the invention, an optical scanning with high picture quality can be performed with even the optical scanner using a light emitting device open-type semiconductor laser. An optical axis adjustment is facilitated.

What is claimed is:

1. An optical scanner comprising:
    a semiconductor laser;
    a circuit board on which the semiconductor laser is mounted;
    a deflector for deflecting a laser beam emitted from the semiconductor laser;
    an image forming optical system for forming an image on a photosensitive member by the laser beam deflected by the deflector; and
    an optical box having an attachment face to which the circuit board is attached,
    wherein the semiconductor laser includes a set of lead frames held by an elastic member;
    wherein an outgoing direction of the laser beam of the semiconductor laser is along the circuit board, and the optical axis of the semiconductor laser is adjusted by moving the circuit board along the attachment face; and
    wherein the elastic member is plate shaped and includes, in its center, a pair of tongue pieces formed by bending and a pressing piece for sandwiching the lead frame of the semiconductor laser in cooperation with the tongue pieces.

2. An optical scanner according to claim 1, wherein an optical axis adjustment in an optical axis direction of the laser beam and a main scanning direction is made by moving the circuit board along the attachment face.

3. An optical scanner according to claim 2, wherein an optical axis adjustment in a sub scanning direction of the laser beam is made by moving the semiconductor laser with respect to the circuit board.

4. An optical scanner according to claim 1, wherein an optical axis adjustment of an outgoing angle in a plane including the main scanning direction of the laser beam is made by moving the circuit board along the attachment face.

5. An optical scanner according to claim 4, wherein the semiconductor includes three leads which are disposed within one plane.

6. An optical scanner according to claim 1, wherein the deflector includes a rotary polygon mirror.

7. An optical scanner according to claim 6, wherein the semiconductor laser is disposed within a center portion in a direction of the circuit board.

8. An optical scanner according to claim 6, wherein the semiconductor laser is disposed at an end in a direction of the circuit board.

9. An optical scanner according to claim 1, wherein the optical box includes a light source, and the light source comprises the semiconductor laser, the circuit board, the elastic member for elastically holding the semiconductor laser, and an angle member for making an adjustment of one direction of the optical axis of an outgoing beam from the semiconductor laser.

10. An optical scanner according to claim 9, wherein the optical box includes a base face, two bosses for attaching the circuit board are provided for the base face, one face of the boss can be made parallel to the main scanning face and, by screwing the circuit board to the bosses, the circuit board can be disposed in parallel with the main scanning face.

11. An optical scanner according to claim 10, wherein the circuit board includes an attaching portion for an adjusting jig and attaching the adjusting jig to the attaching portion enables the adjusting jig and the light source to be movable integrally.

12. An optical scanner according to claim 9, wherein the circuit board includes one face and a solder face, a concave for attaching the semiconductor laser is formed in the circuit board, and by soldering the three leads of the semiconductor laser housed in the concave to the solder face, the main scanning direction of the outgoing beam of the laser are made parallel with the one face of the circuit board.

13. An optical scanner according to claim 12, wherein the semiconductor laser is housed in the circuit board for arranging a sub scanning direction of the outgoing beam of the laser to be perpendicular to the one face of the circuit board.

14. An optical scanner according to claim 1, wherein the angle member includes a center portion, and a pair of contact portions formed by bending both ends of the center portion and the optical scanner further comprises an adjusting screw to be screwed in the center portion.

15. An optical scanner according to claim 14, wherein a hole is formed in each of the contact portions and screwing the circuit board and the elastic member enables the circuit board, the elastic member and the angle member to be assembled integrally.

16. An optical scanner according to claim 14, wherein the adjusting screw includes a head portion and a tip, and integral assembling of the circuit board, the elastic member and the angle member enables the tip of the adjusting screw to come into contact with one face of the pressing piece of the elastic member.

17. An optical scanner according to claim 9, wherein the pressing piece includes a supporting portion, a horizontal portion bent from the tip of the supporting portion at a right angle, and a pair of pressing portions each obtained by bending each of both ends of a wide portion at one end of the horizontal portion, each of the pressing portions is shaped semicircular, and an arc of each of the pressing portions is disposed with a space from the supporting portion of the tongue piece.

18. An optical scanner according to claim 17, wherein a space in one direction of the supporting portions of the pair of tongue pieces and a space in said one direction of said pair of pressing portions of the pressing piece is set to be slightly larger than a width of an outer frame of the semiconductor laser.

19. An optical scanner according to claim 1, wherein the semiconductor laser includes an exposed light emitting device and three leads.

* * * * *